US012634092B2

(12) United States Patent
Ly

(10) Patent No.: US 12,634,092 B2
(45) Date of Patent: May 19, 2026

(54) CHANNEL STATE INFORMATION REFERENCE SIGNAL PORT NUMBERING WITH REDUCED CONFIGURATION

(71) Applicant: QUALCOMM Incorporated, San Diego, CA (US)

(72) Inventor: Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/448,742

(22) Filed: Aug. 11, 2023

(65) Prior Publication Data

US 2025/0055651 A1    Feb. 13, 2025

(51) Int. Cl.
*H04L 5/00* (2006.01)
*H04B 7/06* (2006.01)

(52) U.S. Cl.
CPC ......... *H04L 5/0057* (2013.01); *H04B 7/0602* (2013.01); *H04B 7/0626* (2013.01); *H04B 7/0632* (2013.01); *H04B 7/0639* (2013.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 10,756,800 B2 * | 8/2020 | Wang | ..................... | H04W 24/10 |
| 2016/0156401 A1 * | 6/2016 | Onggosanusi | ....... | H04B 7/0645 |
| | | | | 370/329 |
| 2018/0375561 A1 * | 12/2018 | Park | ..................... | H04B 7/0456 |
| 2025/0168681 A1 * | 5/2025 | Hindy | .................. | H04B 7/0608 |

FOREIGN PATENT DOCUMENTS

| | | | |
|---|---|---|---|
| WO | WO-2021217328 A1 * | 11/2021 | ......... H04B 7/06956 |
| WO | 2023060530 | 4/2023 | |

OTHER PUBLICATIONS

International Search Report and Written Opinion—PCT/US2024/032379—ISA/EPO—Sep. 23, 2024.

* cited by examiner

*Primary Examiner* — Jamaal Henson
(74) *Attorney, Agent, or Firm* — Harrity & Harrity, LLP

(57) ABSTRACT

Various aspects of the present disclosure generally relate to wireless communication. In some aspects, a user equipment (UE) may receive a first configuration of a first channel state information reference signal (CSI-RS) resource for channel measurement with a first CSI-RS port configuration. The UE may receive a second configuration with a second CSI-RS port configuration. The UE may measure a second CSI-RS resource associated with the second configuration and the first CSI-RS resource, wherein the second CSI-RS resource is a subset of the first CSI-RS resource. The UE may compute a channel quality indicator (CQI) based at least in part on renumbering CSI-RS port numbers of the second CSI-RS resource according to the second configuration, and/or a precoding matrix that is based at least in part on the second CSI-RS port configuration. Numerous other aspects are described.

30 Claims, 12 Drawing Sheets

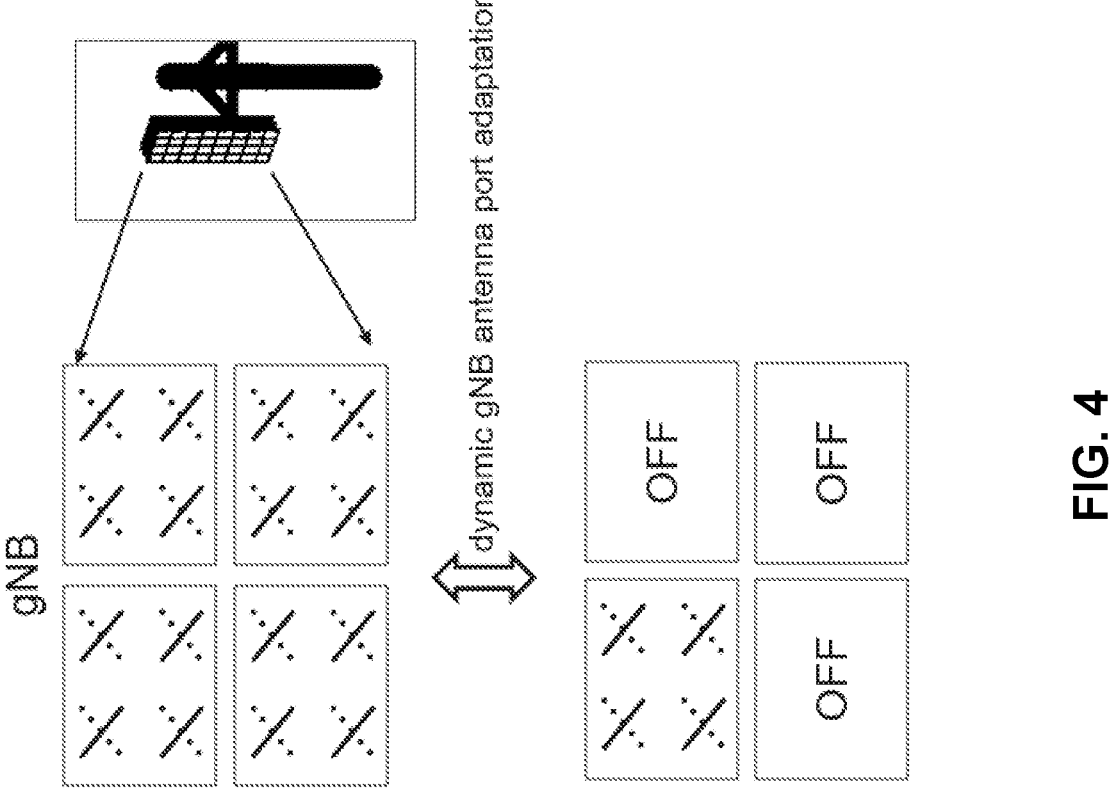
gNB
dynamic gNB antenna port adaptation
OFF    OFF    OFF
400
FIG. 4

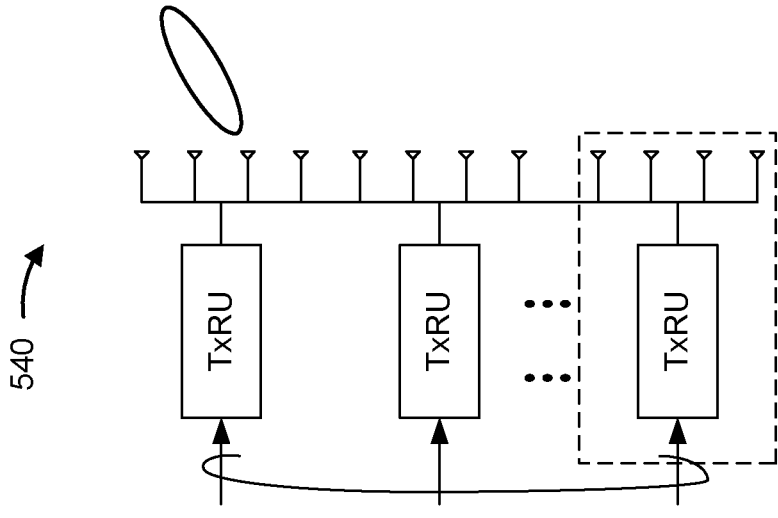
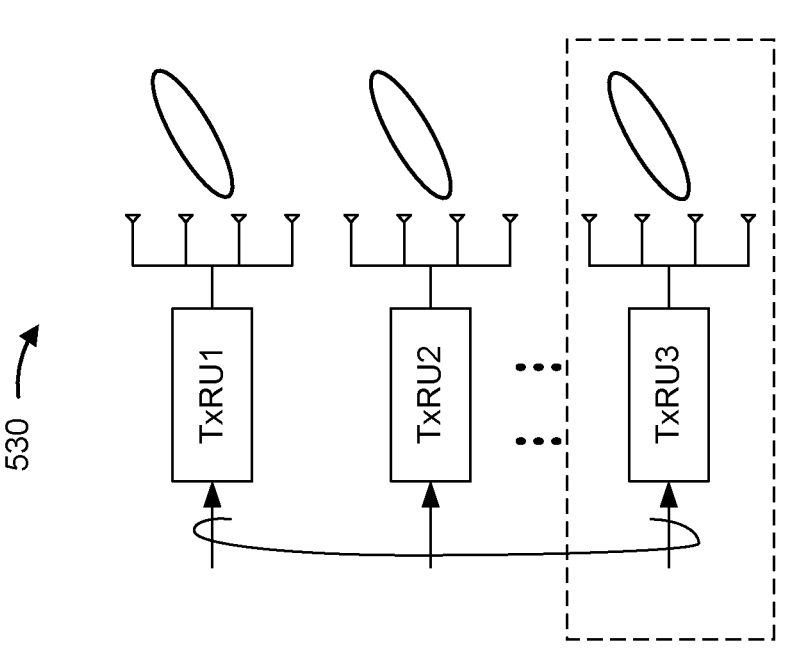
FIG. 5B

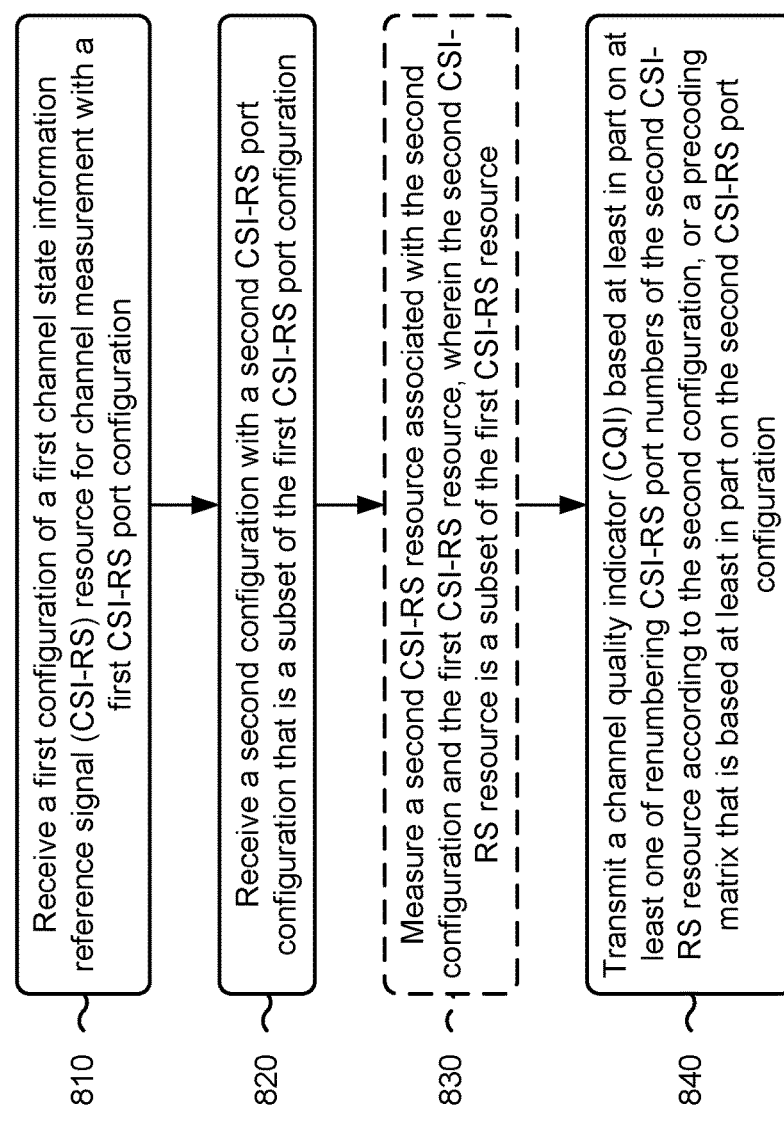

810 — Receive a first configuration of a first channel state information reference signal (CSI-RS) resource for channel measurement with a first CSI-RS port configuration 820 — Receive a second configuration with a second CSI-RS port configuration that is a subset of the first CSI-RS port configuration 830 — Measure a second CSI-RS resource associated with the second configuration and the first CSI-RS resource, wherein the second CSI-RS resource is a subset of the first CSI-RS resource 840 — Transmit a channel quality indicator (CQI) based at least in part on at least one of renumbering CSI-RS port numbers of the second CSI-RS resource according to the second configuration, or a precoding matrix that is based at least in part on the second CSI-RS port configuration

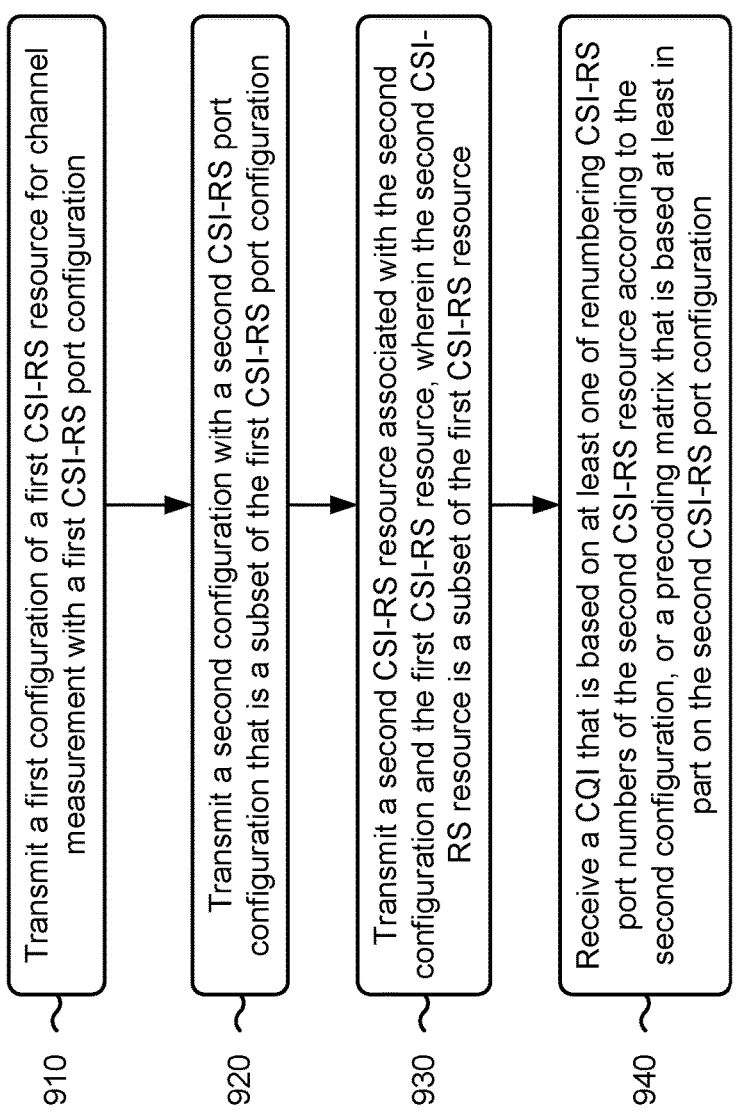

Transmit a first configuration of a first CSI-RS resource for channel measurement with a first CSI-RS port configuration

910

Transmit a second configuration with a second CSI-RS port configuration that is a subset of the first CSI-RS port configuration

920

Transmit a second CSI-RS resource associated with the second configuration and the first CSI-RS resource, wherein the second CSI-RS resource is a subset of the first CSI-RS resource

930

Receive a CQI that is based on at least one of renumbering CSI-RS port numbers of the second CSI-RS resource according to the second configuration, or a precoding matrix that is based at least in part on the second CSI-RS port configuration

CHANNEL STATE INFORMATION REFERENCE SIGNAL PORT NUMBERING WITH REDUCED CONFIGURATION

FIELD OF THE DISCLOSURE

Aspects of the present disclosure generally relate to wireless communication and to techniques and apparatuses for channel state information reference signal port numbering with a reduced configuration.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

In some aspects, an apparatus for wireless communication at a user equipment (UE) includes one or more memories; and one or more processors, coupled to the one or more memories, configured to cause the UE to: receive a first configuration of a first channel state information reference signal (CSI-RS) resource for channel measurement with a first CSI-RS port configuration; receive a second configuration with a second CSI-RS port configuration that is a subset of the first CSI-RS port configuration; measure a second CSI-RS resource associated with the second configuration and the first CSI-RS resource; and transmit a channel quality indicator (CQI) based at least in part on at least one of: renumbering CSI-RS port numbers of a second CSI-RS resource according to the second configuration, wherein the second CSI-RS resource is a subset of the first CSI-RS resource, or a precoding matrix that is based at least in part on the second CSI-RS port configuration.

In some aspects, an apparatus for wireless communication at a network node includes one or more memories; and one or more processors, coupled to the one or more memories, configured to cause the network node to: transmit a first configuration of a first CSI-RS resource for channel measurement with a first CSI-RS port configuration; transmit a second configuration with a second CSI-RS port configuration that is a subset of the first CSI-RS port configuration; transmit a second CSI-RS resource associated with the second configuration and the first CSI-RS resource, wherein the second CSI-RS resource is a subset of the first CSI-RS resource; and receive a CQI that is based on at least one of: renumbering CSI-RS port numbers of the second CSI-RS resource according to the second configuration, or a precoding matrix that is based at least in part on the second CSI-RS port configuration.

In some aspects, a method of wireless communication performed by a UE includes receiving a first configuration of a first CSI-RS resource for channel measurement with a first CSI-RS port configuration; receiving a second configuration with a second CSI-RS port configuration that is a subset of the first CSI-RS port configuration; transmitting a CQI, wherein the CQI is based at least in part on at least one of: renumbering CSI-RS port numbers of a second CSI-RS resource according to the second configuration, wherein the second CSI-RS resource is a subset of the first CSI-RS resource, or a precoding matrix that is based at least in part on the second CSI-RS port configuration.

In some aspects, a method of wireless communication performed by a network node includes transmitting a first configuration of a first CSI-RS resource for channel measurement with a first CSI-RS port configuration; transmitting a second configuration with a second CSI-RS port configuration that is a subset of the first CSI-RS port configuration; transmitting a second CSI-RS resource associated with the second configuration and the first CSI-RS resource, wherein the second CSI-RS resource is a subset of the first CSI-RS resource; and receiving a CQI that is based on at least one of: renumbering CSI-RS port numbers of the second CSI-RS resource according to the second configuration, or a precoding matrix that is based at least in part on the second CSI-RS port configuration.

In some aspects, a non-transitory computer-readable medium storing a set of instructions for wireless communication includes one or more instructions that, when executed by one or more processors of a UE, cause the UE to: receive a first configuration of a first CSI-RS resource for channel measurement with a first CSI-RS port configuration; receive a second configuration with a second CSI-RS port configuration that is a subset of the first CSI-RS port configuration; transmitting a CQI, wherein the CQI is based at least in part on at least one of: renumbering CSI-RS port numbers of the second CSI-RS resource according to the second configuration, wherein the second CSI-RS resource is a subset of the first CSI-RS resource, or a precoding matrix that is based at least in part on the second CSI-RS port configuration.

In some aspects, a non-transitory computer-readable medium storing a set of instructions for wireless communication includes one or more instructions that, when executed by one or more processors of a network node, cause the network node to: transmit a first configuration of a first CSI-RS resource for channel measurement with a first CSI-RS port configuration; transmit a second configuration with a second CSI-RS port configuration that is a subset of the first CSI-RS port configuration; transmit a second CSI-RS resource associated with the second configuration and the first CSI-RS resource, wherein the second CSI-RS resource is a subset of the first CSI-RS resource; and receive a CQI that is based on at least one of: renumbering CSI-RS port numbers of the second CSI-RS resource according to the second configuration, or a precoding matrix that is based at least in part on the second CSI-RS port configuration.

In some aspects, an apparatus for wireless communication includes means for receiving a first configuration of a first CSI-RS resource for channel measurement with a first CSI-RS port configuration; means for receiving a second configuration with a second CSI-RS port configuration that is a subset of the first CSI-RS port configuration; means for transmitting a CQI, wherein the CQI is based at least in part on at least one of: renumbering CSI-RS port numbers of a second CSI-RS resource according to the second configuration, wherein the second CSI-RS resource is a subset of the first CSI-RS resource, or a precoding matrix that is based at least in part on the second CSI-RS port configuration.

In some aspects, an apparatus for wireless communication includes means for transmitting a first configuration of a first CSI-RS resource for channel measurement with a first CSI-RS port configuration; means for transmitting a second configuration with a second CSI-RS port configuration that is a subset of the first CSI-RS port configuration; means for transmitting a second CSI-RS resource associated with the second configuration and the first CSI-RS resource, wherein the second CSI-RS resource is a subset of the first CSI-RS resource; and means for receiving a CQI that is based on at least one of: renumbering CSI-RS port numbers of the second CSI-RS resource according to the second configuration, or a precoding matrix that is based at least in part on the second CSI-RS port configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of spatial adaptation, in accordance with the present disclosure.

FIGS. 5A-5B are diagrams illustrating examples of channel state information reference signal (CSI-RS) beam management procedures, in accordance with the present disclosure.

FIG. 8 is a diagram illustrating an example process performed, for example, at a UE or an apparatus of a UE, in accordance with the present disclosure.

FIG. 9 is a diagram illustrating an example process performed, for example, at a network node or an apparatus of a network node, in accordance with the present disclosure.

DETAILED DESCRIPTION

Figure 1:
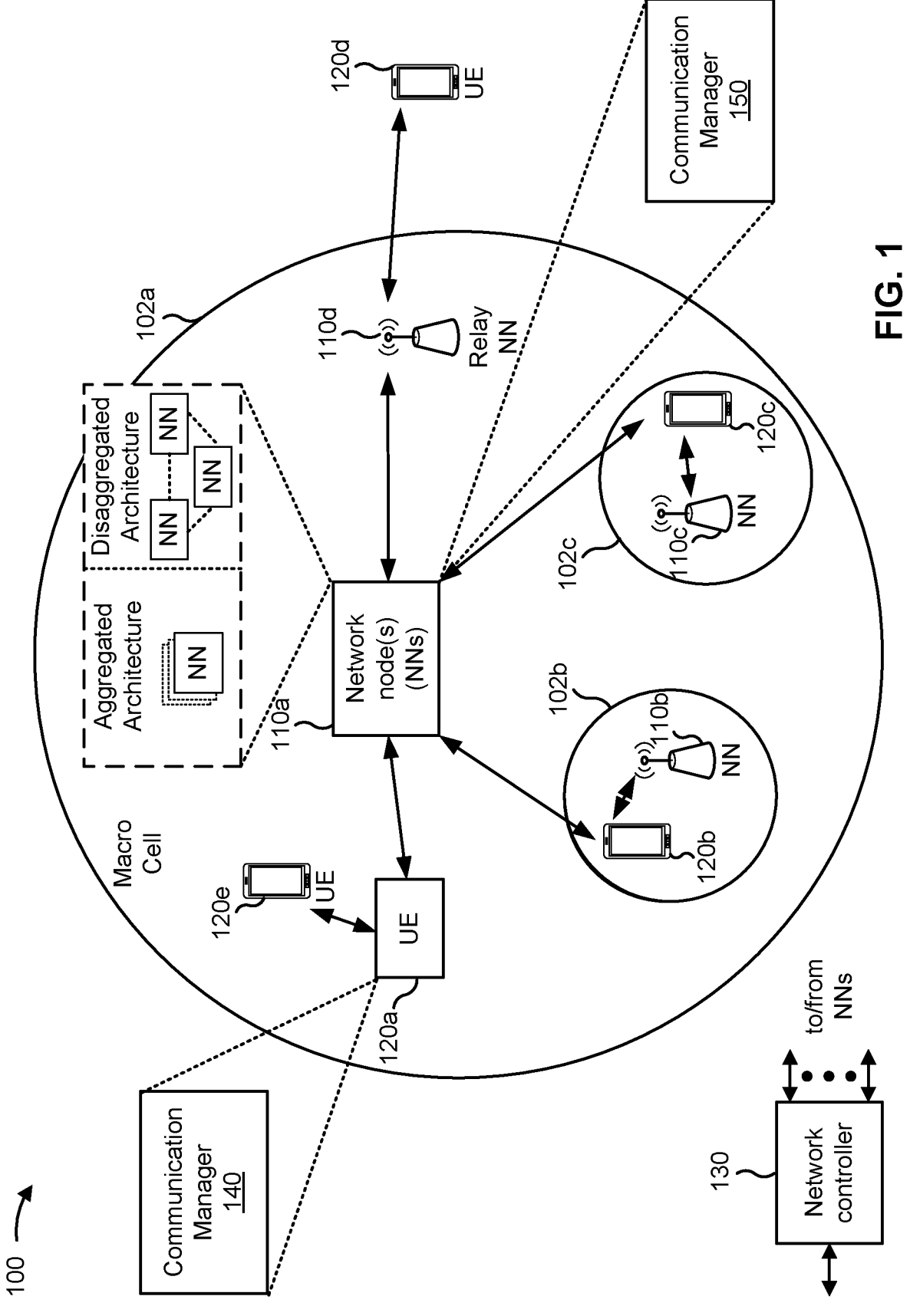
FIG. 1 is a diagram illustrating an example of a wireless network.

A user equipment (UE) may measure channel state information (CSI) reference signals (CSI-RSs) and provide CSI feedback to a network entity for beam management and communication scheduling. The CSI-RSs may be part of a CSI-RS resource that is associated with a two-dimensional antenna array. A network entity (e.g., gNB) may transmit a CSI-RS signal associated with a full antenna array, and the UE may generate multiple CSIs for different antenna subarrays using the same received CSI-RS signal. Each subarray is associated with a subset of CSI-RS ports and the corresponding subset of time/frequency/code resources of the CSI-RS signal. The different subarrays are used by the UE for the purpose of CSI calculation. CSI feedback may include a channel quality indicator (CQI), which is an index identifying a modulation and coding scheme and/or transport block size that the channel can support based on CSI measurement of the channel.

Spatial adaptation may lead to a situation in which the active CSI-RS ports of a CSI-RS have changed. However, CQI computation may rely on a consecutively numbered set of CSI-RS ports and a precoding matrix configured on the assumption that the set of CSI-RS ports is consecutively numbered. Thus, CQI may be undeterminable or inaccurate when a subset of CSI-RS ports of a CSI-RS resource is used to transmit a CSI-RS.

Various aspects of the present disclosure relate generally to CSI measurement and feedback. Some aspects more specifically relate to CSI determination for a reduced CSI-RS resource (e.g., a CSI-RS resource corresponding to a port subset indication). In some aspects, the UE computes a CQI based at least in part on renumbering CSI-RS port numbers of a CSI-RS resource according to a second configuration with a second CSI-RS port configuration for the CSI-RS resource. Additionally, or alternatively, the UE may compute the CQI based at least in part on a precoding matrix that is based at least in part on the second CSI-RS port configuration. In some aspects, an order of antenna port numbers corresponding to active CSI-RS ports of the second CSI-RS port configuration follows an order of the active CSI-RS ports indicated by the second CSI-RS port configuration (e.g., the antenna port numbers may be consecutive and in increasing order). In some aspects, the second CSI-RS port configuration comprises (e.g., consists of) Q CSI-RS ports, and the precoding matrix comprises Q rows selected from a precoding matrix comprising P rows, where an un-reduced CSI-RS port configuration (e.g., the first CSI-RS port configuration described above) has P CSI-RS ports. In some aspects, the precoding matrix comprises Q rows with non-zero values, and a remainder of rows of the precoding matrix (other than the Q rows) are set to zero values.

Particular aspects of the present disclosure may be used to realize one or more of the following possible advantages. By computing the CQI based at least in part on renumbering CSI-RS port numbers of a CSI-RS resource according to a second configuration with a second CSI-RS port configuration for the CSI-RS resource, and/or based at least in part on a precoding matrix that is based at least in part on the second CSI-RS port configuration, the UE enables CQI feedback when a subset of CSI-RS ports of a CSI-RS resource is used to transmit a CSI-RS. By reordering the CSI-RS ports to follow an order of the active CSI-RS ports of the second CSI-RS port configuration, the CQI computation can be performed using a same precoding matrix as for an un-reduced CSI-RS resource. By using a precoding matrix comprising Q rows selected from the precoding matrix having P rows, and/or by setting certain rows of the precoding matrix to zero values, reporting overhead associated with the transmission of a precoding matrix indicator (PMI) as part of CSI reporting is eliminated (since a PMI may not be necessary when a legacy approach using a P-row precoding matrix for an un-reduced CSI port configuration uses the same precoding matrix as these approaches). Furthermore, by using the precoding matrix comprising Q rows selected from the precoding matrix having P rows, computation complexity may be reduced relative to computation of CQI using a precoding matrix having P rows.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120c), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node"

may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, an unmanned aerial vehicle, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120c) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHz) and FR2 (24.25 GHz-52.6 GHZ). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With these examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a first configuration of a first CSI-RS resource for channel measurement with a first CSI-RS port configuration; receive a second configuration with a second CSI-RS port configuration that is a subset of the first CSI-RS port configuration; measure a second CSI-RS resource associated with the second configuration and the first CSI-RS resource, wherein the second CSI-RS resource is a subset of the first CSI-RS resource; and transmit a CQI based at least in part on at least one of: renumbering CSI-RS port numbers of the second CSI-RS resource according to the second configuration, or a precoding matrix that is based at least in part on the second CSI-RS port configuration. Additionally, or alternatively, the communication manager 140 may perform one or more other operations described herein.

In some aspects, the network node 110 may include a communication manager 150. As described in more detail elsewhere herein, the communication manager 150 may transmit a first configuration of a first CSI-RS resource for channel measurement with a first CSI-RS port configuration; transmit a second configuration with a second CSI-RS port configuration that is a subset of the first CSI-RS port configuration; transmit a second CSI-RS resource associated with the second configuration and the first CSI-RS resource, wherein the second CSI-RS resource is a subset of the first CSI-RS resource; and receive a CQI that is based on at least one of: renumbering CSI-RS port numbers of the second CSI-RS resource according to the second configuration, or a precoding matrix that is based at least in part on the second CSI-RS port configuration. Additionally, or alternatively, the communication manager 150 may perform one or more other operations described herein.

As indicated above, FIG. 1 is provided as an example. Other examples may differ from what is described with regard to FIG. 1.

Figure 2:
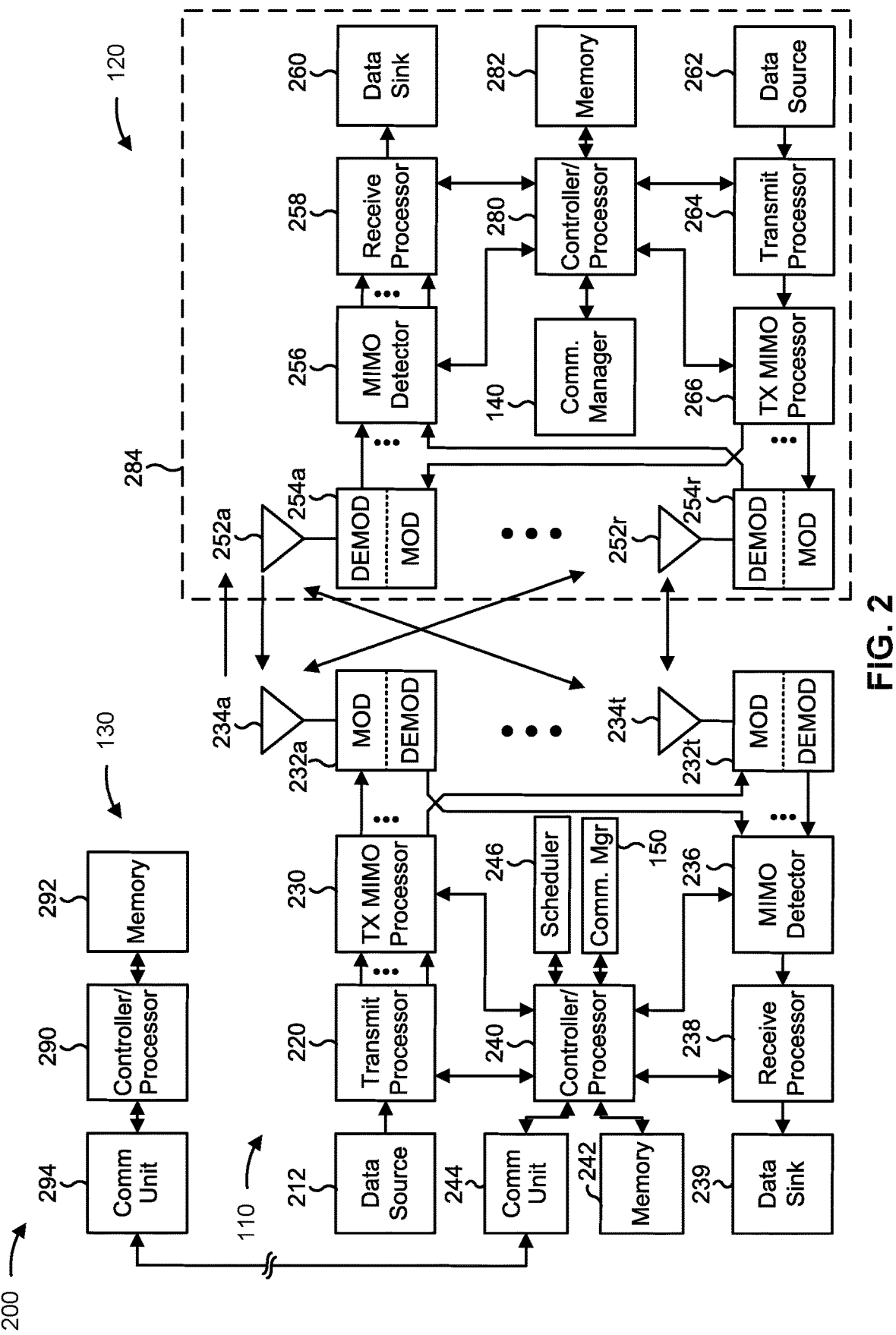
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs)

for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-11).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with CQI computation, as described in more detail elsewhere herein. For example, the controller/processor 240 of the network node 110, the controller/processor 280 of the UE 120, or any other component(s) (or combinations of components) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a first configuration of a first CSI-RS resource for channel measurement with a first CSI-RS port configuration; means for receiving a second configuration with a second CSI-RS port configuration that is a subset of the first CSI-RS port configuration; means for measuring a second CSI-RS resource associated with the second configuration and the first CSI-RS resource, wherein the second CSI-RS resource is a subset of the first CSI-RS resource; means for computing a CQI based at least in part on at least one of: renumbering CSI-RS port numbers of the second CSI-RS resource according to the second configuration, or a precoding matrix that is based at least in part on the second CSI-RS port configuration; and/or means for transmitting the CQI. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting a first configuration of a first CSI-RS resource for channel measurement with a first CSI-RS port configuration; means for transmitting a second configuration with a second CSI-RS port configuration that is a subset of the first CSI-RS port configuration; means for transmitting a second CSI-RS resource associated with the second configuration and the first CSI-RS resource, wherein the second CSI-RS resource is a subset of the first CSI-RS resource; and/or means for receiving a CQI that is based on at least one of: renumbering CSI-RS port numbers of the second CSI-RS resource according to the second configuration, or a precoding matrix that is based at least in part on the second CSI-RS port configuration. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
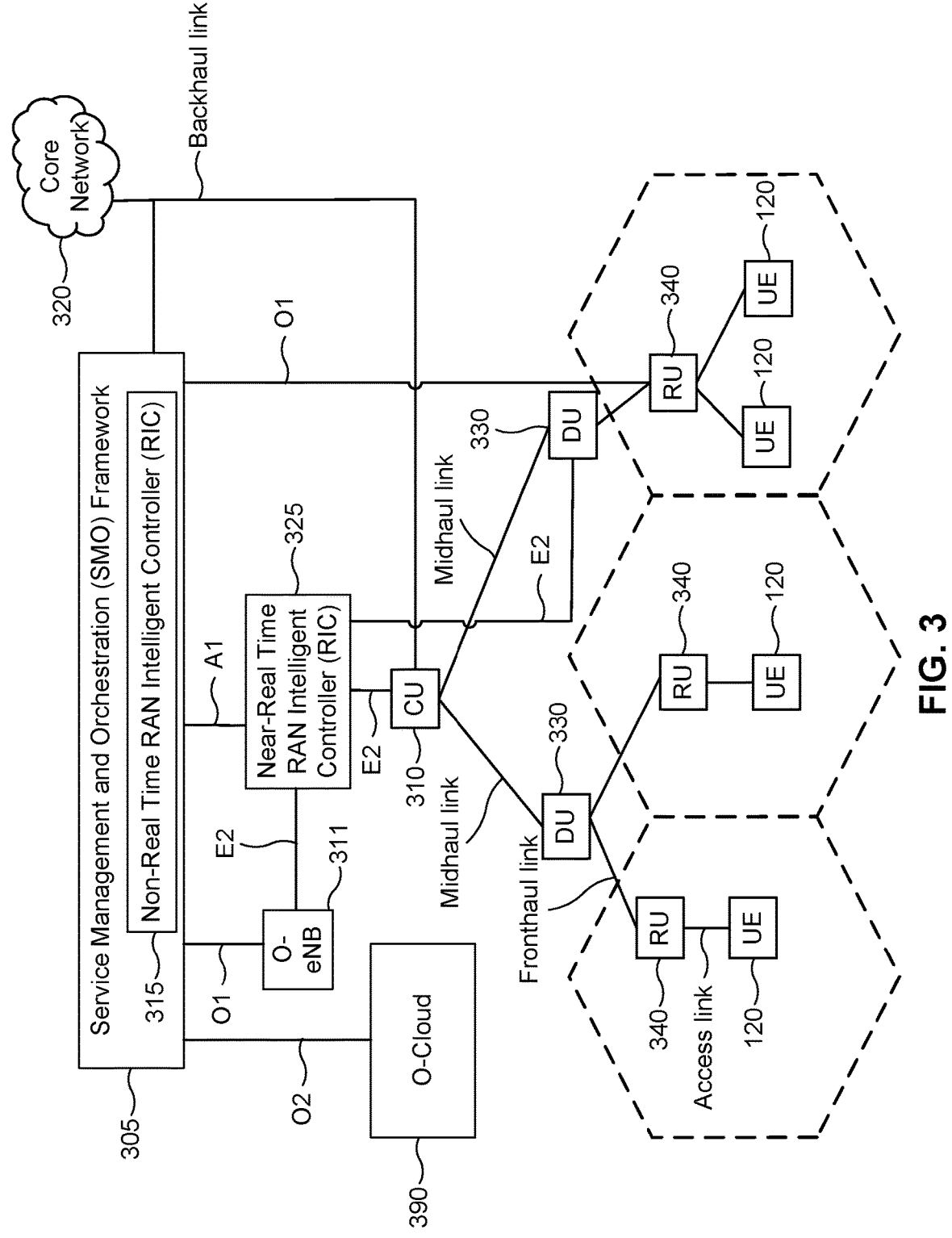
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of spatial adaptation, in accordance with the present disclosure.

Massive MIMO provides high spectral efficiency and extended coverage by communicating using a large number of antennas. For downlink transmission, a network node supporting massive MIMO may be equipped with a large number of transceiver chains (e.g., 64 transceiver chains in FR1 are typically deployed in commercial 5G networks, especially at carrier frequencies of 3.5 GHz and/or higher). Each transceiver chain may be connected to one or more power amplifiers. The power amplifiers may consume a significant portion of the network node's energy (e.g., 70%-80% of base station power). To control or reduce network power consumption, a cell can turn on or off one or more power amplifiers (such as depending on the time and frequency resource utilization in the cell). Equivalently, a cell can turn on or off one or more transceiver chains.

Spatial adaptation at a network node may include deactivating one or more antenna panels (spatial elements, ports) such that fewer antenna panels are active. Example 400 shows four antenna panels of a network node (e.g., gNB). The network node may deactivate three of the four antenna panels. The three deactivated panels are shown as OFF. Indications related to spatial adaptation may help UEs to adapt a channel state information reference signal (CSI-RS) configuration to dynamic or semi-persistent activation or deactivation of CSI-RS, or to reconfigure the CSI-RS configuration with respect to an adapted number of spatial elements or ports. A network entity may dynamically select CSI report configurations via a selected triggering state (e.g., CSI-AperiodicTriggerStateList, CSI-SemiPersistentOn-PUSCH-TriggerStateList), such as by a medium access control control element (MAC CE) or downlink control information (DCI).

Power control offsets may be used to adapt a transmit power for CSI-RSs. In a first step, CSI feedback may be provided for adaptation of power offset values. In a second step, a physical downlink shared channel (PDSCH) may be transmitted with a suitable power offset configuration.

As indicated above, FIG. 4 is provided as an example. Other examples may differ from what is described with regard to FIG. 4.

Figure 5A:
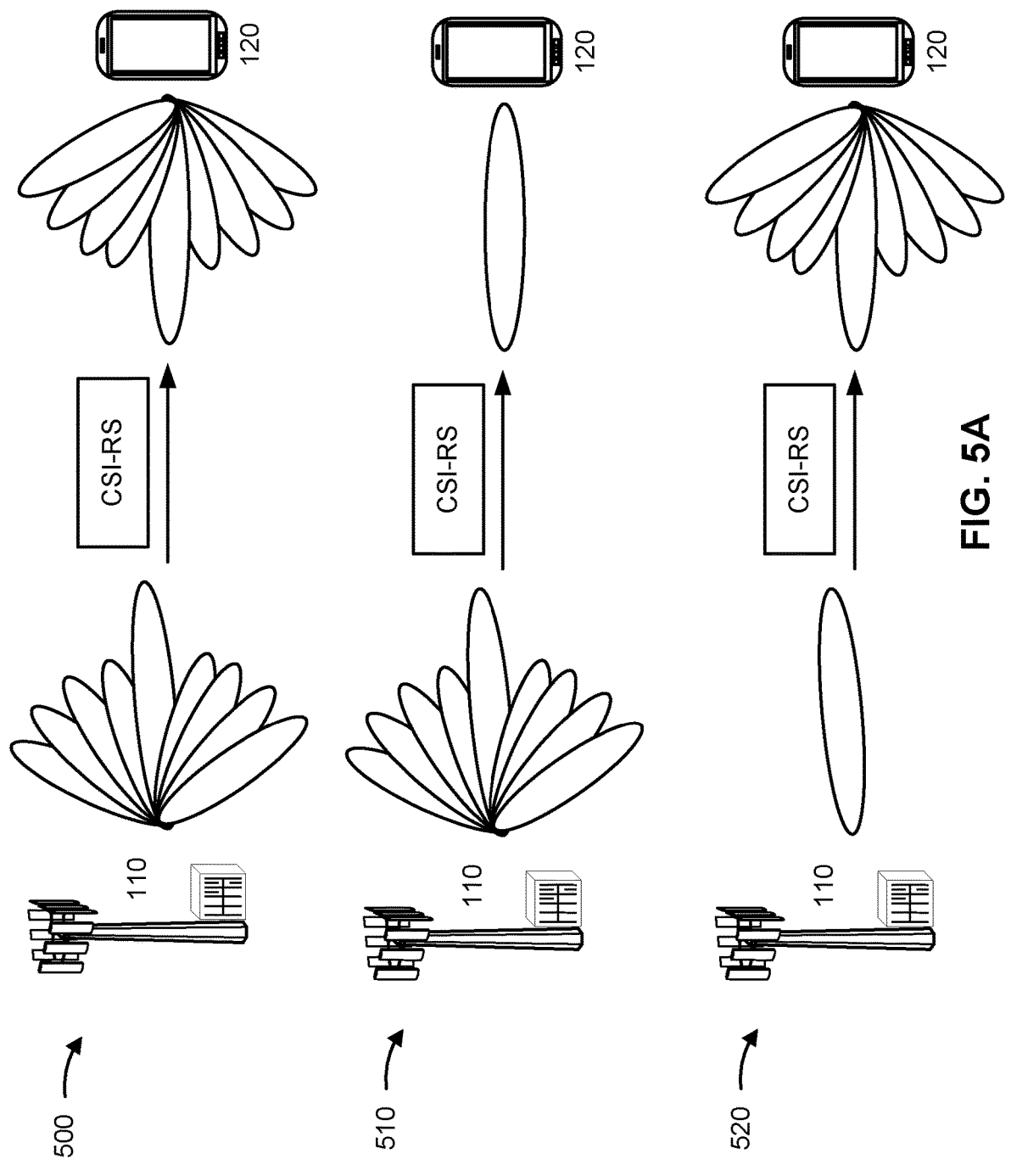

FIGS. 5A-5B are diagrams illustrating examples of CSI-RS beam management procedures, in accordance with the present disclosure. As shown in FIG. 5A, a UE 120 is in communication with a network node 110 in a wireless network (e.g., wireless network 100). However, the devices shown in FIG. 5A are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 5A, example 500 may include a network node 110 (e.g., one or more network node devices such as an RU, a DU, and/or a CU, among other examples) and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the network node 110 to the UE 120. The CSI-RSs may be configured to be periodic (e.g., using RRC signaling), semi-persistent (e.g., using medium access control control element (MAC-CE) signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same reference signal (RS) resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 500 has been described in connection with CSI-RSs, the first beam management process may also use synchronization signal blocks (SSBs) for beam management in a similar manner as described above.

As shown in FIG. 5A, example 510 may include a network node 110 and a UE 120 communicating to perform beam management using CSI-RSs. Example 510 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 5A and example 510, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 5A, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

In some cases, as shown in FIG. 5B and by reference number 530, the on/off capabilities may be associated with a logical antenna port associated with a plurality of transmit receive units (TxRUs) (such as TxRU1, TxRU2, and TxRU3), and the logical antenna port may be turned on or off. This may be referred to as Type 1 spatial domain (SD) adaptation. In Type 1 SD adaptation, a TxRU can be activated or deactivated. In some other cases, referred to as Type 2 SD adaptation and shown by reference number 540, the configuration of physical antenna elements for CSI-RS or PDSCH is adapted. This type of adaptation may be useful for FR2, where the number of TxRUs at the network node is limited (such as 1 or 2 TxRUs). In Type 2 SD adaptation, the number of logical antenna ports may remain unchanged while the number of physical antenna elements can be adapted, hence impacting beamforming gain.

In some cases, such as from a CSI perspective, Type 1 SD adaptation may be the adaptation of antenna ports or transceiver chains at network node. In contrast, Type 2 SD adaptation may be the adaptation of transmission power offset values between CSI-RS and SSB.

In some cases, one non-zero power (NZP) CSI-RS resource configuration for channel measurement within one resource setting corresponding to more than one spatial adaptation pattern may be supported. A spatial adaptation pattern may indicate a set of antenna elements or logical antenna ports to be activated or deactivated. In some cases, a resource set with multiple resources may be configured within a resource setting, where each resource is associated with only one spatial adaptation pattern. In some other cases, for a resource configured in a resource set within a resource setting, the resource can be associated with more than one spatial adaptation pattern. One or more resources can be configured in the resource set for channel measurement. In some cases, one CSI report configuration may include multiple CSIs report sub-configurations, where each sub-configuration corresponds to a single spatial adaptation pattern. For a sub-configuration of a CSI report configuration, the UE 120 may be configured with a port subset indication (e.g., a bitmap). The UE 120 may derive a reduced NZP CSI-RS resource from the corresponding NZP CSI-RS resource configured in the CSI-RS resource set of channel management. Configurations of CSI-RS resources and CSI-RS port configurations, including reduced configurations corresponding to spatial adaptation patterns, are described elsewhere herein.

In some cases, a CSI feedback (CSF) framework may include multiple steps. A first step (e.g., step 1) may be associated with CSF for adaptation of spatial elements. A second step (e.g., step 2) may be associated with identifying or transmitting a physical downlink shared channel (PDSCH) with a suitable configuration of spatial elements. In some cases, for a CSI report configuration with L sub-configuration(s), a framework that enables a UE to report N CSI(s) in one reporting instance, where the N CSI(s) are associated with N sub-configuration(s) from L (where $1 \leq N \leq L$) and each CSI corresponds to one sub-configuration, may be supported. N=1 may refer to single-CSI signaling while N>1 may refer to multi-CSI signaling.

In some cases, for a CSI report configuration, for each sub-configuration for Type 1 SD adaptation, at least the following may be included: one or more parameters in a codebook configuration (CodebookConfig), and a port subset indication or resource grouping. The one or more parameters in the codebook configuration may include, for example, n1-n2, and ng for multi-panel. In some cases, the one or more parameters may also include a rank restriction, a codebook subset restriction, and/or supported codebook types for a PMI (e.g., Type-I or Type-II). The port subset indication or resource grouping may indicate, for example, a report quantity, a report frequency configuration (reportFreqConfiguration), and/or whether it is explicitly provided or can also be derived (e.g., from the CodebookConfig and/or from the CSI-RS resource configuration). For a CSI report configuration, at least the following can be included for each sub-configuration for Type 2 SD adaptation: an NZP CSI-RS resource set for channel measurement, where different resources can have different power offsets between a CSI-RS and SSB. In some cases, a report quantity can also be included.

In one example, a CSI report configuration for Type 1 SD adaptation in accordance with a port subset indication may have three sub-configurations. The CSI report configuration may have a 32-port NZP CSI-RS resource set (for channel measurement). A first sub-configuration (sub-configuration 1) may have a first spatial adaptation pattern (spatial adaptation pattern 1) and may have a first codebook configuration (codebook configuration 1) with (N1, N2)=(8, 2). A second sub-configuration (sub-configuration 2) may have a second spatial adaptation pattern (spatial adaptation pattern 2) and may have a second codebook configuration (codebook configuration 2) with (N1, N2)=(8, 1). Additionally, the second sub-configuration may have 16-port NZP CSI-RS resource (s), where each resource is a subset of a 32-port CSI-RS resource in a CSI-RS resource set and corresponds to a uniform linear array (ULA) with (N1, N2) in codebook 2. A third sub-configuration (sub-configuration 3) may have a third spatial adaptation pattern (spatial adaptation pattern 3) and may have a third codebook configuration (codebook configuration 3) with (N1, N2)=(4, 1). The third sub-configuration may have 8-port NZP CSI-RS resource(s), where each resource is a subset of a 32-port CSI-RS resource in a CSI-RS resource set and corresponds to a ULA with (N1, N2) in codebook 3. In some cases, the resource subset may be determined based at least in part on a port subset indication. The network node 110 may transmit a CSI-RS using a 32-port NZP CSI-RS resource. The UE 120 may measure the 32-port NZP CSI-RS resource, and may derive CSI from the measurement. The CSI may relate to at least one of the 32-port NZP CSI-RS resource or one or more of the sub-configurations, depending on which of the sub-configurations is active for the CSI reporting. In Type 2 SD adaptation, the CSI report configuration may indicate a set of P-port CSI-RS resources for channel measurement, and may indicate one or more sub-configurations, where each sub-configuration indicates a set of CSI resource index identifiers corresponding to one or more CSI-RS resources of the set of P-port CSI-RS resources. In Type 2 SD adaptation, the network node 110 may transmit CSI-RSs using each CSI-RS resource indicated by any active sub-configuration of the one or more sub-configurations.

In another example, a CSI report configuration for Type 1 SD adaptation, in accordance with resource grouping may have three sub-configurations. The CSI report configuration may have a 32-port NZP CSI-RS resource set (for channel measurement). A first sub-configuration (sub-configuration 1) may have a first spatial adaptation pattern (spatial adaptation pattern 1) and may have a first codebook configuration (codebook configuration 1) with (N1, N2)=(8, 2). A second sub-configuration (sub-configuration 2) may have a second spatial adaptation pattern (spatial adaptation pattern 2) and may have a second codebook configuration (codebook configuration 2) with (N1, N2)=(8.1). Additionally, the second sub-configuration may have a 16-port NZP CSI-RS resource set for channel measurement. A third sub-configuration (sub-configuration 3) may have a third spatial adaptation pattern (spatial adaptation pattern 3) and may have a third codebook configuration (codebook configuration 3) with (N1, N2)=(4, 1). Additionally, the third sub-configuration may have an 8-port NZP CSI-RS resource set for channel measurement. In some cases, there may be no relationship between the resources in the different sub-configurations.

In some cases, a dynamic adaptation of power offset values between PDSCH and CSI-RS may be beneficial for network energy savings. A network node may be able to compensate for some measurements (such as Layer 1 (L1) RSRP and CQI) in accordance with a transmission power difference between an actual power offset and a configured power offset used by the UE for the CSI report. This may be beneficial when the transmission power difference is not large. However, when the transmission power difference is large, the compensation at the network node may not be accurate for parameters such as rank indicator (RI) and/or PMI. In some cases, the dynamic adaptation of the power offset values between PDSCH and CSI-RS can be identified in accordance with an example two-step process. In a first step (e.g., step 1), a CSF for adaptation of power offset values may be identified. In a second step (e.g., step 2), a PDSCH with a suitable power offset configuration may be identified. In some cases, a configuration of more than one power offset value for the PDSCH relative to the CSI-RS may be supported.

In some cases, a framework for power domain (PD) adaptation may be similar to the framework for the spatial domain adaptation described above (e.g., for Type 2 SD). Differences between the SD adaptation and the PD adaptation may be in the sub-configurations, as described below.

For a CSI report configuration with L sub-configuration (s), a framework that enables a UE to report N CSI(s) in one reporting instance, where the N CSI(s) are associated with N sub-configuration(s) from L (where 1≤N≤L) and each CSI corresponds to one sub-configuration, may be supported. N=1 may refer to single-CSI while N>1 may refer to multi-CSI.

As described in 3GPP Technical Specification (TS) 38.321, Release 17, section 5.18.6, for reporting on a physical uplink control channel (PUCCH), the UE may receive an activation command via a MAC-CE. The network may activate and deactivate the configured semi-persistent CSI reporting on the PUCCH of a serving cell by sending the SP CSI reporting on a PUCCH activation/deactivation MAC-CE. The configured semi-persistent CSI reporting on the PUCCH may be initially deactivated upon configuration and after a handover. In this case, if the MAC entity receives an SP CSI reporting on PUCCH activation/deactivation MAC-CE on a serving cell, the MAC entity may indicate, to lower layers, the information regarding the SP CSI reporting on PUCCH activation/deactivation MAC-CE. In some cases, the SP CSI on PUCCH activation/deactivation MAC-CE may be identified by a MAC subheader with a logical channel ID (LCID). The MAC subheader may have a serving cell ID field, a bandwidth part (BWP) ID field, an Si field, and a reserved bit (R) field, as described in as described in 3GPP TS 38.321 section 6.1.3.16, Release 17.

In some cases, a UE may receive triggering information for reporting CSI. In some cases, the UE may receive DCI that indicates for the UE to aperiodically report CSI via a physical uplink shared channel (PUSCH). A list of trigger states may be configured in a CSI aperiodic trigger state list (CSI-AperiodicTriggerStateList), and each trigger state included in the list of trigger states may include a list of associated reporting settings. In some other cases, the UE may receive DCI that indicates for the UE to semi-persistently report CSI via the PUSCH. A list of trigger states may be configured in a CSI semi-persistent state list (CSI-SemiPersistentOnPUSCH-TriggerStateList), and each trigger state included in the list of trigger states may include a list of associated reporting settings. In some other cases, the UE may receive a MAC-CE that indicates for the UE to semi-persistently report CSI via a PUCCH. In some cases, for a CSI report configuration with L sub-configuration(s), the UE may be configured to report N CSI(s) in a single reporting instance, where the N CSI(s) are associated with N sub-configuration(s) from L (where 1≤N≤L) and each CSI corresponds to a single sub-configuration.

As indicated above, FIGS. 5A-5B are provided as examples. Other examples may differ from what is described with regard to FIGS. 5A-5B.

Figure 6:
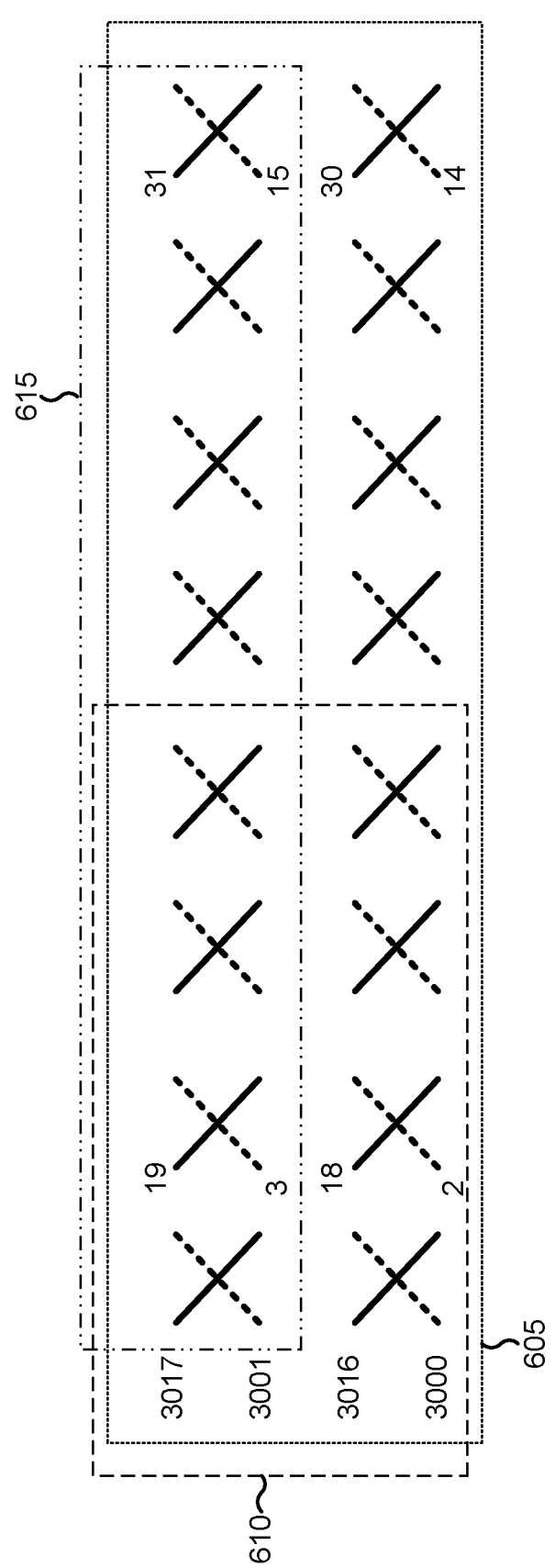
FIG. 6 is a diagram illustrating an example of CSI-RS ports, in accordance with the present disclosure.

FIG. 6 is a diagram illustrating an example 600 of CSI-RS ports, in accordance with the present disclosure. A CSI-RS port may be referred to as a CSI-RS antenna port. CSI-RS ports are indicated by a CSI-RS resource configuration, and are associated with port numbers. A CSI-RS port's number may be based at least in part on a CSI-RS sequence index, a code division multiplexing (CDM) group size, and a total number of CSI-RS ports. CSI-RS ports are numbered starting at 3000. In particular, CSI-RS ports are numbered as {3000, 3001} for 2 CSI-RS ports, 4 CSI-RS ports {3000, 3001, 3002, 3003}. 8 CSI-RS ports {3000, 3001, . . . , 3007}, 12 CSI-RS ports {3000, 3001, . . . , 3011}, 16 CSI-RS ports {3000, 3001, . . . , 3015}, 24 CSI-RS ports {3000, 3001, . . . , 3023}, and 32 CSI-RS ports {3000, 3001, . . . 3031}.

A UE may calculate a channel quality indicator (CQI) of CSF using CSI-RS port numbering. For example, the CSI-RS port numbering may allow the UE to identify or assume an antenna relationship between the CSI-RS and a PDSCH. In particular, for CQI calculation, the UE may assume that PDSCH signals on antenna ports in the set [1000, . . . , 1000+v−1] for v layers would result in signals equivalent to corresponding symbols transmitted on antenna ports [3000, . . . , 3000+P−1], as given by $$\begin{bmatrix} y^{(3000)}(i) \\ \cdots \\ y^{(3000+P-1)}(i) \end{bmatrix} = W_i(i) \begin{bmatrix} x^{(0)}(i) \\ \cdots \\ x^{(v-1)}(i) \end{bmatrix}, \text{ where } x(i) = \begin{bmatrix} x^{(0)}(i) \ \cdots \ x^{(v-1)}(i) \end{bmatrix}^T$$

is a vector of PDSCH symbols from a defined layer mapping, P is a number of CSI-RS ports, and W (i) is a precoding matrix. If only one CSI-RS port is configured, W (i) may be 1 (one). If the higher layer parameter reportQuantity in CSI-ReportConfig for which the CQI is reported is set to either 'cri-RI-PMI-CQI' or 'cri-RI-LI-PMI-CQI', W (i) may be the precoding matrix corresponding to the reported PMI applicable to x(i). If the higher layer parameter reportQuantity in CSI-ReportConfig for which the CQI is reported is set to 'cri-RI-CQI', W (i) may be the precoding matrix corresponding to a procedure described in Clause 5.2.1.4.2 of 3GPP TS 38.214, Release 17. If the higher layer parameter reportQuantity in CSI-ReportConfig for which the CQI is reported is set to 'cri-RI-il-CQI', W (i) is the precoding matrix corresponding to the reported i1 according to the procedure described in Clause 5.2.1.4.2 of 3GPP TS 38.214, Release 17.

Reference number 605 illustrates a first CSI-RS port configuration corresponding to a first CSI-RS resource. As shown, the first CSI-RS port configuration includes 32 CSI-RS ports (P=32), numbered 3000 through 3031. The first CSI-RS resource may be considered a 32-port NZP CSI-RS resource, and may be configured (via a first configuration which may include a CSI report configuration) in an NZP CSI-RS resource set for channel management with CSI-RS port configuration (N1, N2)=(8, 2), corresponding to 2 rows and 8 columns of CSI-RS ports. Each of the CSI-RS ports of the first CSI-RS port configuration may be referred to as active CSI-RS ports, since each of these CSI-RS ports may be measured to compute CSI using a CSI-RS transmitted in accordance with the first CSI-RS port configuration. "Active CSI-RS port" may be used interchangeably with "CSI-RS port for CSI measurement" herein. A CSI-RS resource may be configured for channel measurement, meaning that the CSI-RS resource is used to derive CSI for a channel. Other types of CSI-RS resource may include zero-power CSI-RS resources and CSI-RS resources for interference measurement.

Reference number 610 illustrates a second CSI-RS port configuration that is a subset (e.g., a proper subset) of the first CSI-RS port configuration. For example, the second CSI-RS port configuration may be configured, via a second configuration which may comprise or may be included in a sub-configuration, using a port subset indication. The port subset indication may include a P-bit bitmap that indicates which CSI-RS ports, of the first CSI-RS port configuration, are active (that is, used for measurement of CSI) in the second CSI-RS port configuration. In this example, the 32-bit bitmap may include values (11111111000000001111111100000000) which means that CSI-RS ports {3000, 3001, 3002, . . . , 3007, 3016, 3017, . . . , 3023} are used for CQI computation. The remaining CSI-RS ports may not be used for CSI measurement or CQI computation, and thus may be referred to as inactive in this context. The second CSI-RS port configuration may be associated with a second CSI-RS resource that is associated with the first CSI-RS resource and is a subset of the first CSI-RS resource. "Measurement of a CSI-RS" or "measurement of a channel" may include taking one or more samples at a time and/or frequency and/or spatial resource identified by a CSI-RS resource. These samples can then be used to determine CSI.

Reference number 615 illustrates a third CSI-RS port configuration that is a subset (e.g., a proper subset) of the first CSI-RS port configuration. For example, the third CSI-RS port configuration may be configured, via a third configuration which may comprise or may be included in a sub-configuration, using a port subset indication. The port subset indication may include a P-bit bitmap that indicates which CSI-RS ports, of the first CSI-RS port configuration, are active in the second CSI-RS port configuration. In this example, the 32-bit bitmap may include values (0 1 0 1 0 1 0 1 0 1 0 1 0 1 0 1 0 1 0 1 0 1 0 1 0 1 0 1 0 1 0 1) which means that odd CSI-RS ports {3001, 3003, 3005, . . . , 3015, 3017, 3019, . . . , 2031} are used for CQI computation. The third CSI-RS port configuration may be associated with a third CSI-RS resource that is associated with the first CSI-RS resource and is a subset of the first CSI-RS resource.

A network node 110 may transmit a CSI-RS in accordance with the first CSI-RS resource (referred to as transmitting the first CSI-RS resource). The UE 120 may determine CSI (e.g., compute CQI) by measuring the CSI-RS and applying parameters of the second configuration and/or the third configuration. For example (such as in Type 1 SD adaptation), the UE 120 may determine CSI for any active sub-configuration of a CSI-RS resource (or a CSI-RS resource set) using a CSI-RS transmitted in accordance with the CSI-RS resource.

The CSI-RS port configurations shown by reference numbers 610 and 615 may have a non-consecutive numbering of CSI-RS ports, since a subset of CSI-RS ports have been deactivated in these configurations. However, CQI computation may rely on a consecutively numbered set of CSI-RS ports and a precoding matrix configured on the assumption that the set of CSI-RS ports is consecutively numbered. Thus, CQI may be undeterminable or inaccurate when a subset of CSI-RS ports of a CSI-RS resource is used to transmit a CSI-RS.

Various aspects of the present disclosure relate generally to CSI measurement and feedback. Some aspects more specifically relate to CSI determination for a reduced CSI-RS resource (e.g., a CSI-RS resource corresponding to a port subset indication). In some aspects, the UE computes a CQI based at least in part on renumbering CSI-RS port numbers of a CSI-RS resource according to a second configuration with a second CSI-RS port configuration for the CSI-RS resource. Additionally, or alternatively, the UE may compute the CQI based at least in part on a precoding matrix that is based at least in part on the second CSI-RS port configuration. In some aspects, an order of antenna port numbers corresponding to active CSI-RS ports of the second CSI-RS port configuration follows an order of the active CSI-RS ports indicated by the second CSI-RS port configuration (e.g., the antenna port numbers may be consecutive and in increasing order). In some aspects, the second CSI-RS port configuration comprises (e.g., consists of) Q CSI-RS ports, and the precoding matrix comprises Q rows selected from a precoding matrix comprising P rows, where an un-reduced CSI-RS port configuration (e.g., the first CSI-RS port configuration described above) has P CSI-RS ports. In some aspects, the precoding matrix comprises Q rows with non-zero values, and a remainder of rows of the precoding matrix (other than the Q rows) are set to zero values.

Particular aspects of the present disclosure may be used to realize one or more of the following possible advantages. By computing the CQI based at least in part on renumbering CSI-RS port numbers of a CSI-RS resource according to a second configuration with a second CSI-RS port configuration for the CSI-RS resource, and/or based at least in part on a precoding matrix that is based at least in part on the second CSI-RS port configuration, the UE enables CQI feedback when a subset of CSI-RS ports of a CSI-RS resource is used to transmit a CSI-RS. By reordering the CSI-RS ports to follow an order of the active CSI-RS ports of the second CSI-RS port configuration, the CQI computation can be performed using a same precoding matrix as for an un-reduced CSI-RS resource. By using a precoding matrix comprising Q rows selected from the precoding matrix having P rows, and/or by setting certain rows of the precoding matrix to zero values, reporting overhead associated with the transmission of a precoding matrix indicator (PMI) as part of CSI reporting is eliminated (since a PMI may not be necessary when a legacy approach using a P-row precoding matrix for an un-reduced CSI port configuration uses the same precoding matrix as these approaches). Furthermore, by using the precoding matrix comprising Q rows selected from the precoding matrix having P rows, computation complexity may be reduced relative to computation of CQI using a precoding matrix having P rows.

Figure 7:
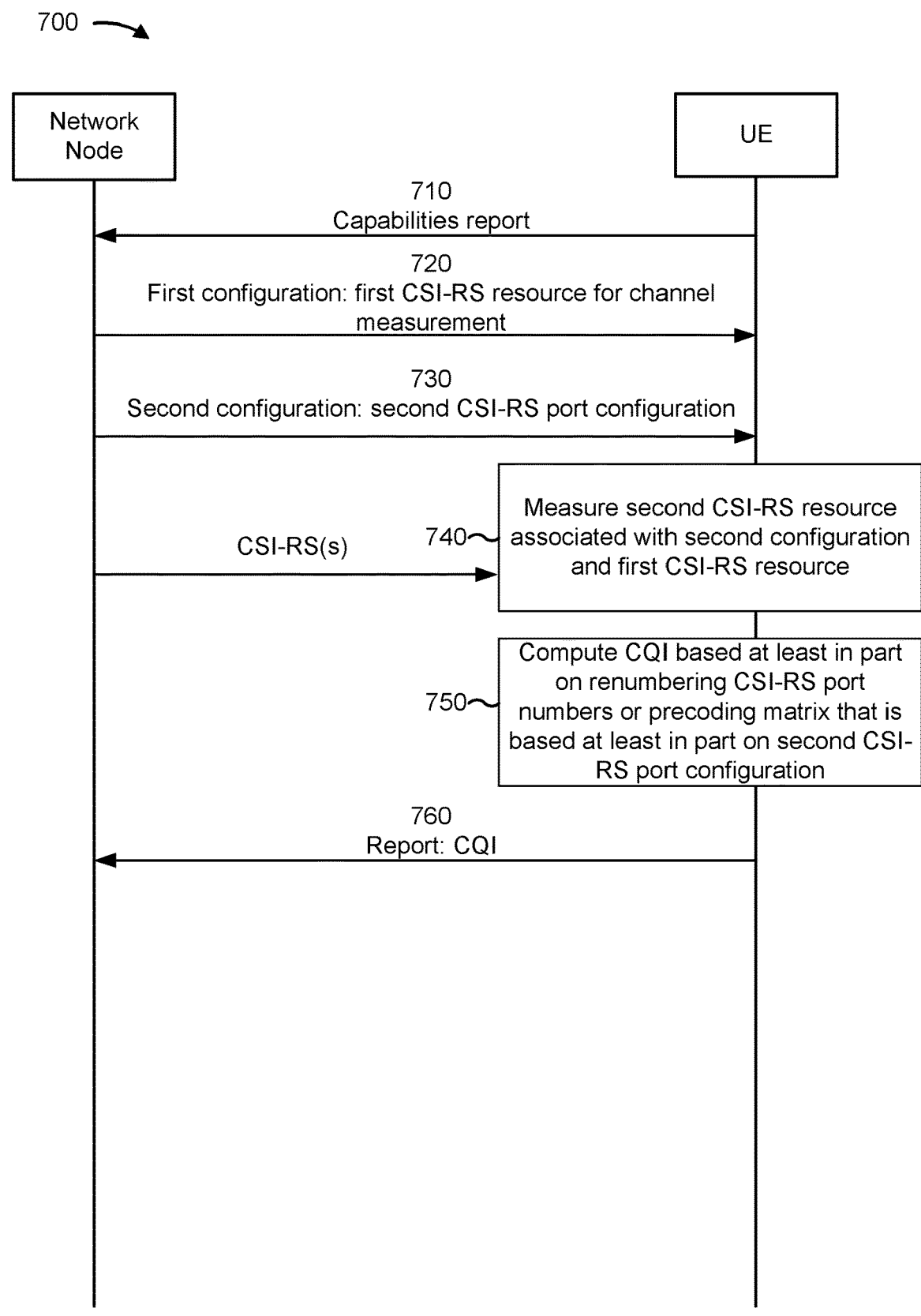
FIG. 7 is a diagram of an example associated with channel quality indicator (CQI) calculation for reduced CSI-RS resources, in accordance with the present disclosure.

FIG. 7 is a diagram of an example 700 associated with CQI calculation for reduced CSI-RS resources, in accordance with the present disclosure. As shown in FIG. 7, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 7.

As shown by reference number 710, the UE may transmit, and the network node may receive, a capabilities report. The capabilities report may indicate whether the UE supports a feature and/or one or more parameters related to the feature. For example, the capability information may indicate a capability and/or parameter for dynamic gNB antenna adaptation. One or more operations described herein may be based on capability information of the capabilities report. For example, the UE may perform a communication in accordance with the capability information, or may receive configuration information that is in accordance with the capability information. In some aspects, the capabilities report may indicate UE support for one or more features described herein, such as configuration of a reduced CSI-RS resource (e.g., associated with dynamic gNB antenna adaptation), computation of CSI based at least in part on the reduced CSI-RS resource, or a combination thereof.

As shown by reference number 720, the network node may transmit, and the UE may receive, a first configuration of a first CSI-RS resource for channel measurement (referred to hereinafter as "first CSI-RS resource"). The first CSI-RS resource may include a first CSI-RS port configuration. The first configuration may include, for example, a CSI-RS resource configuration that indicates the first CSI-RS port configuration, which is described with regard to FIG. 6. In some aspects, the first configuration may comprise or be included in a CSI report configuration. For example, the UE may receive a CSI report configuration indicating a CSI-RS resource for channel measurement and L sub-configurations of the CSI-RS resource, as described with regard to FIG. 6. In some aspects, the CSI report configuration may indicate a CSI-RS resource set including the CSI-RS resource. The UE may determine CSI for each CSI-RS resource of the CSI-RS resource set (e.g., in accordance with one or more sub-configurations or port subset indications), and may report at least part of the determined CSI. Thus, the techniques described herein can be applied for multiple CSI-RS resources configured as part of a CSI-RS resource set (e.g., a second configuration with a second CSI-RS port configuration can be applied for each CSI-RS resource of the CSI-RS resource set).

As shown by reference number 730, the network node may transmit, and the UE may receive, a second configuration with a second CSI-RS port configuration. The second CSI-RS port configuration may be a subset of the first CSI-RS port configuration. For example, the second CSI-RS port configuration may be a proper subset of the first CSI-RS port configurations, meaning that the second CSI-RS port configuration includes only CSI-RS ports belonging to the first CSI-RS port configuration, and includes fewer than all CSI-RS ports of the first CSI-RS port configuration. The second configuration may include a port subset indication that identifies the second CSI-RS port configuration relative to the first CSI-RS port configuration, as described with regard to FIG. 6. Since the second CSI-RS port configuration indicates fewer active CSI-RS ports than the first CSI-RS port configuration, the second CSI-RS port configuration may correspond to a second CSI-RS resource that is associated with the first CSI-RS resource (where the second CSI-RS resource may be derived from the second CSI-RS port configuration).

In some aspects, at least part of the second configuration (e.g., the port subset indication, an indication of one or more selected sub-configurations of the L sub-configurations, or an entirety of the L sub-configurations) may comprise or be included in a CSI report configuration, such as the CSI report configuration described with regard to reference number 720. Additionally, or alternatively, at least part of the second configuration may comprise or be included in lower-layer signaling. For example, for an aperiodic CSI report or semi-persistent CSI report on a PUSCH, the UE may receive DCI triggering a CSI report and carrying an indication of a subset of N sub-configurations (out of the L sub-configurations) for CSI measurement and reporting. As another example, for semi-persistent CSI reporting on the PUCCH, the UE may receive MAC signaling triggering a CSI report and carrying an indication of a subset of N sub-configurations for CSI measurement and reporting. In some aspects, for periodic CSI, the UE may measure and report CSI corresponding to all L sub-configurations received in the CSI report configuration described with regard to reference number 720. In some aspects, the first configuration may be received with the second configuration. In some aspects, the first configuration may be received separately from the second configuration. In some aspects, a first part of the second configuration may be received separately from a second part of the second configuration.

In some aspects, the configuration information described in connection with reference numbers 720 and/or 730, and/or the capabilities report, may include information transmitted via multiple communications. Additionally, or alternatively, the network node may transmit the configuration information, or a communication including at least a portion of the configuration information, before and/or after the UE transmits the capabilities report. For example, the network node may transmit a first portion of the configuration information before the capabilities report, the UE may transmit at least a portion of the capabilities report, and the network node may transmit a second portion of the configuration information after receiving the capabilities report. In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC CEs and/or one or more DCI messages, among other examples. The UE may configure itself based at least in part on the configuration information. In some aspects, the UE may be configured to perform one or more operations described herein based at least in part on the configuration information.

As shown by reference number 740, the UE may measure a second CSI-RS resource associated with the second configuration and the first CSI-RS resource. The second CSI-RS resource may be associated with the second configuration because the second CSI-RS resource has a number and/or configuration of CSI-RS ports indicated by the second CSI-RS port configuration of the second configuration. The second CSI-RS resource may be associated with the first CSI-RS resource because the second CSI-RS resource's CSI-RS port configuration is defined relative to the first CSI-RS port configuration of the first CSI-RS resource. Measuring the second CSI-RS resource may include measuring the first CSI-RS resource and determining CSI according to parameters of the second CSI-RS resource. The network node may transmit a CSI-RS in accordance with the second configuration and the first CSI-RS resource. For example, if the first CSI-RS resource includes P CSI-RS ports, the network node may transmit a CSI-RS using the P CSI-RS ports. Additionally, or alternatively, the network node may transmit a CSI-RS using a number of ports indicated by the second configuration.

As shown by reference number 750, the UE may compute a CQI based at least in part on measuring the second CSI-RS resource. For example, the UE may compute the CQI using data derived from channel measurement on the second CSI-RS resource. In some aspects, the UE may measure the first CSI-RS resource and may use channel measurement information regarding the second CSI-RS resource (which may be determined as part of measuring the first CSI-RS resource, and which may be referred to as measuring the second CSI-RS resource) to compute the CQI. Techniques for computing the CQI are described below.

In some aspects, the UE may compute the CQI based at least in part on renumbering CSI-RS port numbers of the second CSI-RS resource according to the second configuration. For example, the second CSI-RS resource may be associated with an original port numbering, such as {3000, 3001, 3002, . . . , 3007, 3016, 3017, . . . , 2023} for the example second CSI-RS port configuration shown by reference number 610 or {3001, 3003, 3005, . . . , 3015, 3017, 3019, . . . , 2031} for the example third CSI-RS port configuration shown by reference number 615. The UE may renumber the original port numbering so that antenna port numbers of the second CSI-RS resource are consecutive and start at a lowest port value (e.g., 3000). The UE may then compute the CQI according to a precoding matrix. The precoding matrix may be based at least in part on the second CSI-RS port configuration. For example, the precoding matrix may be selected according to a number of CSI-RS ports of the second CSI-RS port configuration.

For example, the second CSI-RS port configuration may indicate Q active CSI-RS ports. Computing the CQI may be based at least in part on a vector y that comprises Q antenna port numbers corresponding to the Q active CSI-RS ports of the second CSI-RS port configuration:

$$\begin{bmatrix} y^{(3000)}(i) \\ \cdots \\ y^{(3000+Q-1)}(i) \end{bmatrix}.$$

As shown, an order of the Q antenna port numbers, with respect to the Q active CSI-RS ports, follows an order of the Q active CSI-RS ports indicated by the second CSI-RS port configuration (e.g., the port subset indication that defines the second CSI-RS port configuration). In this example, an antenna port may be used for CQI computation if a corresponding bit in the bitmap for the port subset indication is set to 1. Computing the CQI may be based at least in part on a precoding matrix W (i), and the precoding matrix may correspond to a value of Q. For example, W (i) may be the precoding matrix corresponding to Q CSI-RS ports. In this example, the UE may compute the CQI as follows:

For CQI calculation using a reduced NZP CSI-RS resource (e.g., the second CSI-RS resource, CSI-RS resources described with regard to reference number 610 or 615) of Q ports which is a subset of a P-port NZP CSI-RS resource (e.g., the first CSI-RS resource, the CSI-RS resource described with regard to reference number 605) configured in an NZP CSI-RS resource set for channel measurement, the UE may assume that PDSCH signals on antenna ports in the set [1000, . . . , 1000+v−1] for v layers would result in signals equivalent to corresponding symbols transmitted on antenna ports [3000, . . . , 3000+Q−1], as given by $$\begin{bmatrix} y^{(3000)}(i) \\ \cdots \\ y^{(3000+Q-1)}(i) \end{bmatrix} = W_i(i) \begin{bmatrix} x^{(0)}(i) \\ \cdots \\ x^{(v-1)}(i) \end{bmatrix}$$

where the vector $[y^{(3000)}(i), \ldots, y^{(3000+Q-1)}(i)]$ corresponds to the (active) antenna ports indicated in the associated port subset indication to be used for CQI computation and the order of the ports follows the order of the active antenna ports indicated in the port subset indication, an antenna port is used for CQI computation if its corresponding bit in the bitmap for port subset indication is set to 1, and W (i) is a precoding matrix corresponding to Q CSI-RS ports. In this example, W (i) may be determined according to procedures described with regard to FIG. 6 (e.g., W (i) may be a legacy precoding matrix for Q CSI-RS ports, and/or may not include zero-value rows or a set of rows selected from a precoding matrix for P CSI-RS ports).

Applying the above example for reference number 610 of FIG. 6, the original port numbering of {3000, 3001, 3002, . . . , 3007, 3016, 3017, . . . , 3023} may be renumbered to {3000, 3001, 3002, . . . , 3007, 3008, 3009, . . . , 3015}. Applying the above example for reference number 615 of FIG. 6, the original port numbering of {3001, 3003, 3005, . . . , 3015, 3017, 3019, . . . , 2031} may be renumbered to {3000, 3001, 3002, . . . , 3007, 3008, 3009, . . . , 3015}. Thus, the UE can apply the precoding matrix for P CSI-RS ports to calculate CSI.

In some aspects, the precoding matrix is based at least in part on the second CSI-RS port configuration. For example, the precoding matrix may have a number of rows equal to a number of CSI-RS ports of the second CSI-RS port configuration. For example, if the second CSI-RS port configuration indicates Q active CSI-RS ports, and a PDSCH antenna port configuration indicates v PDSCH antenna ports, then the precoding matrix may include Q rows and v columns. For example, the precoding matrix may consist of Q rows. In some aspects, the Q rows of the precoding matrix are selected from another precoding matrix comprising P rows and v columns. For example, the port subset indication for the second CSI-RS port configuration can be used to select a subset of rows from a precoding matrix that is designed for the P-port NZP CSI-RS resource configured in an NZP CSI-RS resource set for channel measurement (where P>Q). In this example, the UE may also renumber port numbers of the second CSI-RS resource, as described above. The UE may calculate the CQI as follows:

For CQI calculation using a reduced NZP CSI-RS resource (e.g., the second CSI-RS resource, CSI-RS resources described with regard to reference number 610 or 615) of Q ports which is a subset of a P-port NZP CSI-RS resource (e.g., the first CSI-RS resource, the CSI-RS resource described with regard to reference number 605) configured in an NZP CSI-RS resource set for channel measurement, the UE may assume that PDSCH signals on antenna ports in the set [1000, . . . , 1000+v−1] for v layers would result in signals equivalent to corresponding symbols transmitted on antenna ports [3000, . . . , 3000+Q−1], as given by $$\begin{bmatrix} y^{(3000)}(i) \\ \cdots \\ y^{(3000+Q-1)}(i) \end{bmatrix} = W_i(i) \begin{bmatrix} x^{(0)}(i) \\ \cdots \\ x^{(v-1)}(i) \end{bmatrix}$$

where the vector $[y^{(3000)}(i), \ldots, y^{(3000+Q-1)}(i)]$ corresponds to the (active) antenna ports indicated in the associated port subset indication to be used for CQI computation and the order of the ports follows the order of the active antenna ports indicated in the port subset indication (e.g., the second CSI-RS port configuration), an antenna port is used for CQI computation if its corresponding bit in the bitmap for port subset indication is set to 1, and W (i) is a precoding matrix of Q rows and v columns, where the Q rows are selected from a precoding matrix of P rows and v columns for P CSI-RS ports.

As another example of how the precoding matrix can be based at least in part on the second CSI-RS port configuration, the precoding matrix may comprise P rows and v columns, wherein Q rows of the precoding matrix are set to non-zero values. The Q rows of the precoding matrix may correspond to Q active CSI-RS ports of the second CSI-RS port configuration. For example, if a third CSI-RS port of the first CSI-RS port configuration is deactivated in the second CSI-RS port configuration, a third row of the precoding matrix may be set to zero values, whereas if the third CSI-RS port is active, the third row may be set to non-zero values (e.g., according to values of the precoding matrix comprising P rows and v columns). In this example, (P minus Q) rows of the precoding matrix may be set to zero values. In this example, in some aspects, the UE may not renumber the CSI-RS ports. The UE may compute the CQI as follows:

For CQI calculation using a reduced NZP CSI-RS resource (e.g., the second CSI-RS resource, CSI-RS resources described with regard to reference number 610 or 615) of Q ports which is a subset of a P-port NZP CSI-RS resource (e.g., the first CSI-RS resource, the CSI-RS resource described with regard to reference number 605) configured in an NZP CSI-RS resource set for channel measurement, the UE may assume that PDSCH signals on antenna ports in the set [1000, . . . , 1000+v−1] for v layers would result in signals equivalent to corresponding symbols transmitted on antenna ports [3000, . . . , 3000+P−1], as given by $$\begin{bmatrix} y^{(3000)}(i) \\ \ldots \\ y^{(3000+P-1)}(i) \end{bmatrix} = W_i(i) \begin{bmatrix} x^{(0)}(i) \\ \ldots \\ x^{(v-1)}(i) \end{bmatrix}$$

where W (i) is a precoding matrix of P rows and v columns where the rows whose CSI-RS ports are not used for CQI computation based on a port subset indication (i.e., the corresponding bit in the port subset indication bitmap is set to 0) are set to zeros.

As shown by reference number 760, the UE may transmit, and the network node may receive, CSF. The CSF may include the CQI. In some aspects, the network node may configure a communication in accordance with the CSF or the CQI. For example, the network node may configure an MCS for a communication according to the CQI.

As indicated above, FIG. 7 is provided as an example. Other examples may differ from what is described with respect to FIG. 7.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with channel state information reference signal port numbering with reduced configuration.

As shown in FIG. 8, in some aspects, process 800 may include receiving a first configuration of a first CSI-RS resource for channel measurement with a first CSI-RS port configuration (block 810). For example, the UE (e.g., using reception component 1002 and/or communication manager 1006, depicted in FIG. 10) may receive a first configuration of a first CSI-RS resource for channel measurement with a first CSI-RS port configuration, as described above with regard to reference number 720 of FIG. 7.

As further shown in FIG. 8, in some aspects, process 800 may include receiving a second configuration with a second CSI-RS port configuration that is a subset of the first CSI-RS port configuration (block 820). For example, the UE (e.g., using reception component 1002 and/or communication manager 1006, depicted in FIG. 10) may receive a second configuration with a second CSI-RS port configuration that is a subset of the first CSI-RS port configuration, as described above with regard to reference number 730 of FIG. 7.

As further shown in FIG. 8, in some aspects, process 800 may include measuring a second CSI-RS resource associated with the second configuration and the first CSI-RS resource, wherein the second CSI-RS resource is a subset of the first CSI-RS resource (block 830). For example, the UE (e.g., using communication manager 1006, depicted in FIG. 10) may optionally measure a second CSI-RS resource associated with the second configuration and the first CSI-RS resource, wherein the second CSI-RS resource is a subset of the first CSI-RS resource, as described above with regard to reference number 740 of FIG. 7. In some aspects, measuring the second CSI-RS resource may be included in measuring the first CSI-RS resource.

As further shown in FIG. 8, in some aspects, process 800 may include transmitting a CQI, wherein the CQI is based at least in part on at least one of: renumbering CSI-RS port numbers of the second CSI-RS resource according to the second configuration, or a precoding matrix that is based at least in part on the second CSI-RS port configuration (block 840). For example, the UE (e.g., using communication manager 1006, depicted in FIG. 10) may compute and/or transmit a CQI. The CQI may be based at least in part on at least one of: renumbering CSI-RS port numbers of the second CSI-RS resource according to the second configuration, or a precoding matrix that is based at least in part on the second CSI-RS port configuration, as described above with regard to reference number 750 of FIG. 7.

Process 800 may include additional aspects, such as any single aspect or any combination of aspects described below and/or in connection with one or more other processes described elsewhere herein.

In a first aspect, the second CSI-RS port configuration indicates Q active CSI-RS ports, wherein computing the CQI is based at least in part on a vector y that comprises Q antenna port numbers corresponding to the Q active CSI-RS ports of the second CSI-RS port configuration.

In a second aspect, alone or in combination with the first aspect, an order of the Q antenna port numbers, with respect to the Q active CSI-RS ports, follows an order of the Q active CSI-RS ports indicated by the second CSI-RS port configuration.

In a third aspect, alone or in combination with one or more of the first and second aspects, the CQI is based at least in part on the precoding matrix, and the precoding matrix corresponds to a value of Q.

In a fourth aspect, alone or in combination with one or more of the first through third aspects, the Q antenna port numbers are consecutive.

In a fifth aspect, alone or in combination with one or more of the first through fourth aspects, Q and v are positive integers.

In a sixth aspect, alone or in combination with one or more of the first through fifth aspects, the first CSI-RS port configuration indicates P active CSI-RS ports, the second CSI-RS port configuration indicates Q active CSI-RS ports, and a physical downlink shared channel (PDSCH) antenna port configuration indicates v PDSCH antenna ports, wherein the precoding matrix comprises Q rows and v columns.

In a seventh aspect, alone or in combination with one or more of the first through sixth aspects, the Q rows are selected from another precoding matrix comprising P rows and v columns.

In an eighth aspect, alone or in combination with one or more of the first through seventh aspects, the CQI is based at least in part on a vector y that comprises Q antenna port numbers corresponding to the Q active CSI-RS ports of the second CSI-RS port configuration, wherein an order of the Q antenna port numbers in the vector y, with respect to the Q active CSI-RS ports, follows an order of the Q active CSI-RS ports indicated by the second CSI-RS port configuration.

In a ninth aspect, alone or in combination with one or more of the first through eighth aspects, the first CSI-RS port configuration indicates P active CSI-RS ports, the second CSI-RS port configuration indicates Q active CSI-RS ports, and a PDSCH antenna port configuration indicates v PDSCH antenna ports, wherein the precoding matrix comprises P rows and v columns.

In a tenth aspect, alone or in combination with one or more of the first through ninth aspects, Q rows of the precoding matrix are set to non-zero values, and the Q rows correspond to the Q active CSI-RS ports.

In an eleventh aspect, alone or in combination with one or more of the first through tenth aspects, (P minus Q) rows of the precoding matrix are set to zero values.

In a twelfth aspect, alone or in combination with one or more of the first through eleventh aspects, the CQI is based at least in part on a vector y that comprises P antenna port numbers corresponding to the P active CSI-RS ports of the first CSI-RS port configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, at a network node or an apparatus of a network node, in accordance with the present disclosure. Example process 900 is an example where the apparatus or the network node (e.g., network node 110) performs operations associated with channel state information reference signal port numbering with reduced configuration.

As shown in FIG. 9, in some aspects, process 900 may include transmitting a first configuration of a first CSI-RS resource for channel measurement with a first CSI-RS port configuration (block 910). For example, the network node (e.g., using transmission component 1104 and/or communication manager 1106, depicted in FIG. 11) may transmit a first configuration of a first CSI-RS resource for channel measurement with a first CSI-RS port configuration, as described above with regard to reference number 720 of FIG. 7.

As further shown in FIG. 9, in some aspects, process 900 may include transmitting a second configuration with a second CSI-RS port configuration that is a subset of the first CSI-RS port configuration (block 920). For example, the network node (e.g., using transmission component 1104 and/or communication manager 1106, depicted in FIG. 11) may transmit a second configuration with a second CSI-RS port configuration that is a subset of the first CSI-RS port configuration, as described above with regard to reference number 730 of FIG. 7.

As further shown in FIG. 9, in some aspects, process 900 may include transmitting a second CSI-RS resource associated with the second configuration and the first CSI-RS resource, wherein the second CSI-RS resource is a subset of the first CSI-RS resource (block 930). For example, the network node (e.g., using transmission component 1104 and/or communication manager 1106, depicted in FIG. 11) may transmit a second CSI-RS resource associated with the second configuration and the first CSI-RS resource, wherein the second CSI-RS resource is a subset of the first CSI-RS resource, as illustrated in FIG. 7 and described elsewhere herein, such as in connection with FIG. 6. In some aspects, transmitting the second CSI-RS resource may be included in transmitting the first CSI-RS resource.

As further shown in FIG. 9, in some aspects, process 900 may include receiving a CQI that is based on at least one of: renumbering CSI-RS port numbers of the second CSI-RS resource according to the second configuration, or a precoding matrix that is based at least in part on the second CSI-RS port configuration (block 940). For example, the network node (e.g., using reception component 1102 and/or communication manager 1106, depicted in FIG. 11) may receive a CQI that is based on at least one of: renumbering CSI-RS port numbers of the second CSI-RS resource according to the second configuration, or a precoding matrix that is based at least in part on the second CSI-RS port configuration, as described above.

Process 900 may include additional aspects, such as any single aspect or any combination of aspects described below and/or in connection with one or more other processes described elsewhere herein.

In a first aspect, the second CSI-RS port configuration indicates Q active CSI-RS ports, wherein the CQI is based at least in part on a vector y that comprises Q antenna port numbers corresponding to the Q active CSI-RS ports of the second CSI-RS port configuration.

In a second aspect, alone or in combination with the first aspect, an order of the Q antenna port numbers, with respect to the Q active CSI-RS ports, follows an order of the Q active CSI-RS ports indicated by the second CSI-RS port configuration.

In a third aspect, alone or in combination with one or more of the first and second aspects, the CQI is based at least in part on the precoding matrix, and the precoding matrix corresponds to a value of i.

In a fourth aspect, alone or in combination with one or more of the first through third aspects, the Q antenna port numbers are consecutive.

In a fifth aspect, alone or in combination with one or more of the first through fourth aspects, Q and v are positive integers.

In a sixth aspect, alone or in combination with one or more of the first through fifth aspects, the first CSI-RS port configuration indicates P active CSI-RS ports, the second CSI-RS port configuration indicates Q active CSI-RS ports, and a PDSCH antenna port configuration indicates v PDSCH antenna ports, wherein the precoding matrix comprises Q rows and v columns.

In a seventh aspect, alone or in combination with one or more of the first through sixth aspects, the Q rows are selected from another precoding matrix comprising P rows and v columns.

In an eighth aspect, alone or in combination with one or more of the first through seventh aspects, the CQI is based at least in part on a vector y that comprises Q antenna port numbers corresponding to the Q active CSI-RS ports of the second CSI-RS port configuration, wherein an order of the Q antenna port numbers in the vector y, with respect to the Q active CSI-RS ports, follows an order of the Q active CSI-RS ports indicated by the second CSI-RS port configuration.

In a ninth aspect, alone or in combination with one or more of the first through eighth aspects, the first CSI-RS port configuration indicates P active CSI-RS ports, the second CSI-RS port configuration indicates Q active CSI-RS ports, and a PDSCH antenna port configuration indicates v PDSCH antenna ports, wherein the precoding matrix comprises P rows and v columns.

In a tenth aspect, alone or in combination with one or more of the first through ninth aspects, Q rows of the precoding matrix are set to non-zero values, and the Q rows correspond to the Q active CSI-RS ports.

In an eleventh aspect, alone or in combination with one or more of the first through tenth aspects, (P minus Q) rows of the precoding matrix are set to zero values.

In a twelfth aspect, alone or in combination with one or more of the first through eleventh aspects, the CQI is based at least in part on a vector y that comprises P antenna port numbers corresponding to the P active CSI-RS ports of the first CSI-RS port configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
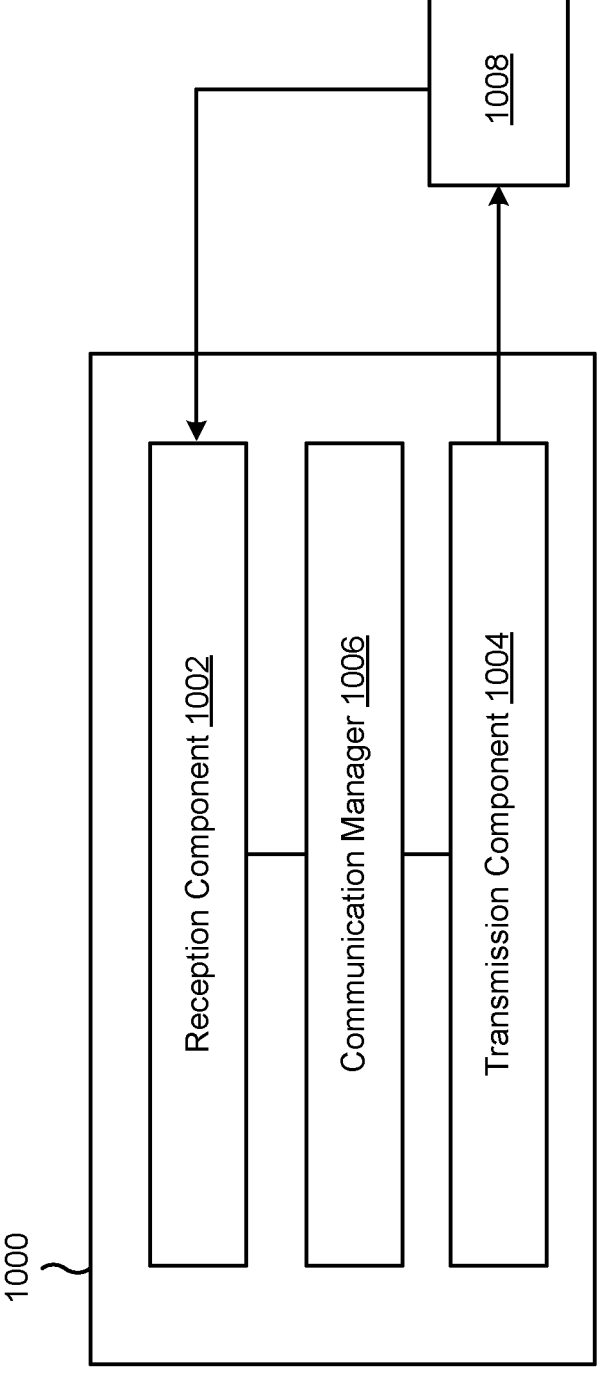
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a first configuration of a first CSI-RS resource for channel measurement with a first CSI-RS port configuration. The reception component 1002 may receive a second configuration with a second CSI-RS port configuration that is a subset of the first CSI-RS port configuration. The communication manager 1006 may measure a second CSI-RS resource associated with the second configuration and the first CSI-RS resource, wherein the second CSI-RS resource is a subset of the first CSI-RS resource. The communication manager 1006 may compute a CQI based at least in part on at least one of renumbering CSI-RS port numbers of the second CSI-RS resource according to the second configuration, or a precoding matrix that is based at least in part on the second CSI-RS port configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
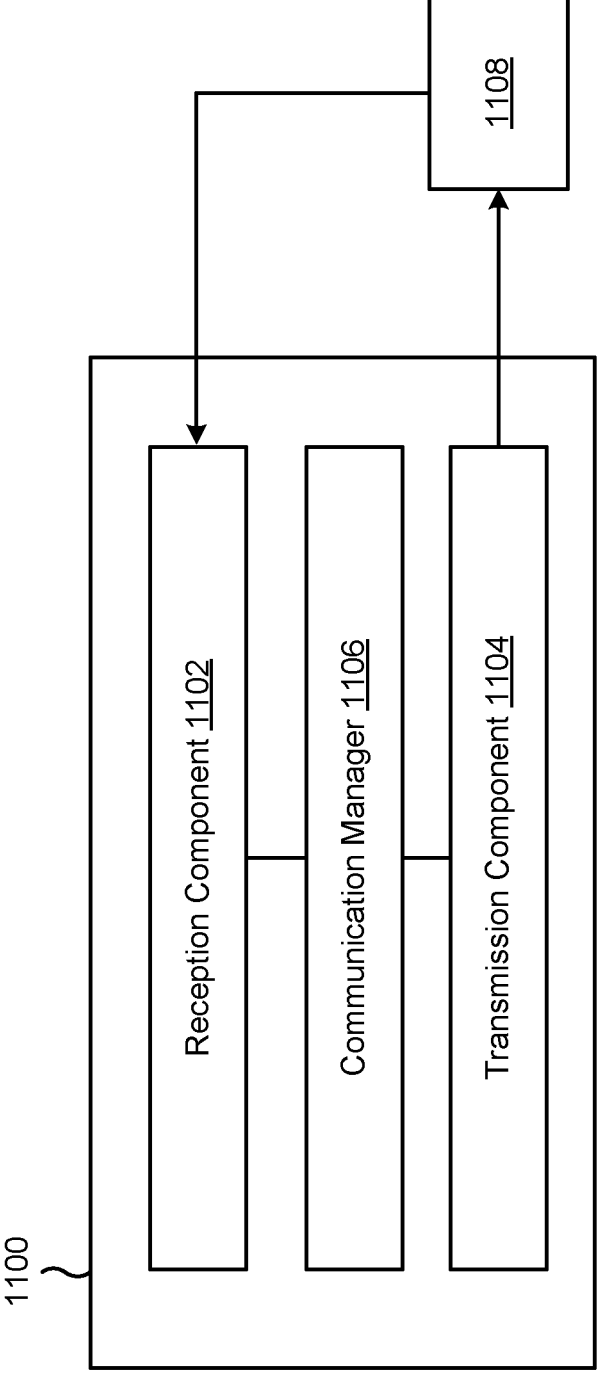
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1102 and/or the transmission component 1104 may include or May be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit a first configuration of a first CSI-RS resource for channel measurement with a first CSI-RS port configuration. The transmission component 1104 may transmit a second configuration with a second CSI-RS port configuration that is a subset of the first CSI-RS port configuration. The transmission component 1104 may transmit a second CSI-RS resource associated with the second configuration and the first CSI-RS resource, wherein the second CSI-RS resource is a subset of the first CSI-RS resource. The reception component 1102 may receive a CQI that is based on at least one of renumbering CSI-RS port numbers of the second CSI-RS resource according to the second configuration, or a precoding matrix that is based at least in part on the second CSI-RS port configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a first configuration of a first channel state information reference signal (CSI-RS) resource for channel measurement with a first CSI-RS port configuration; receiving a second configuration with a second CSI-RS port configuration that is a subset of the first CSI-RS port configuration; computing a channel quality indicator (CQI), wherein the CQI is based at least in part on at least one of: renumbering CSI-RS port numbers of a second CSI-RS resource according to the second configuration, wherein the second CSI-RS resource is a subset of the first CSI-RS resource, or a precoding matrix that is based at least in part on the second CSI-RS port configuration.

Aspect 2: The method of Aspect 1, wherein the second CSI-RS port configuration indicates Q CSI-RS ports for CSI measurement, wherein computing the CQI is based at least in part on a vector y that comprises Q antenna port numbers corresponding to the Q CSI-RS ports of the second CSI-RS port configuration.

Aspect 3: The method of Aspect 2, wherein an order of the Q antenna port numbers, with respect to the Q CSI-RS ports for CSI measurement, follows an order of the Q CSI-RS ports indicated by the second CSI-RS port configuration.

Aspect 4: The method of Aspect 2, wherein the CQI is based at least in part on the precoding matrix, and the precoding matrix corresponds to a value of Q.

Aspect 5: The method of Aspect 2, wherein the Q antenna port numbers are consecutive.

Aspect 6: The method of Aspect 2, wherein Q and v are positive integers.

Aspect 7: The method of any of Aspects 1-6, wherein the first CSI-RS port configuration indicates P CSI-RS ports for CSI measurement, the second CSI-RS port configuration indicates Q CSI-RS ports for CSI measurement, and a physical downlink shared channel (PDSCH) antenna port configuration indicates v PDSCH antenna ports, wherein the precoding matrix comprises Q rows and v columns.

Aspect 8: The method of Aspect 6, wherein the Q rows are selected from another precoding matrix comprising P rows and v columns.

Aspect 9: The method of Aspect 7, wherein the CQI is based at least in part on a vector y that comprises Q antenna port numbers corresponding to the Q CSI-RS ports of the second CSI-RS port configuration, wherein an order of the Q antenna port numbers in the vector y, with respect to the Q CSI-RS ports, follows an order of the Q CSI-RS ports indicated by the second CSI-RS port configuration.

Aspect 10: The method of any of Aspects 1-9, wherein the first CSI-RS port configuration indicates P CSI-RS ports for CSI measurement, the second CSI-RS port configuration indicates Q CSI-RS ports for CSI measurement, and a physical downlink shared channel (PDSCH) antenna port configuration indicates v PDSCH antenna ports, wherein the precoding matrix comprises P rows and v columns.

Aspect 11: The method of Aspect 9, wherein Q rows of the precoding matrix are set to non-zero values, and wherein the Q rows correspond to the Q CSI-RS ports for CSI measurement.

Aspect 12: The method of Aspect 10, wherein (P minus Q) rows of the precoding matrix are set to zero values.

Aspect 13: The method of Aspect 9, wherein the CQI is based at least in part on a vector y that comprises P antenna port numbers corresponding to the P CSI-RS ports of the first CSI-RS port configuration.

Aspect 14: A method of wireless communication performed by a network node, comprising: transmitting a first configuration of a first channel state information reference signal (CSI-RS) resource for channel measurement with a first CSI-RS port configuration; transmitting a second configuration with a second CSI-RS port configuration that is a subset of the first CSI-RS port configuration; transmitting a second CSI-RS resource associated with the second configuration and the first CSI-RS resource, wherein the second CSI-RS resource is a subset of the first CSI-RS resource; and receiving a channel quality indicator (CQI) that is based on at least one of: renumbering CSI-RS port numbers of the second CSI-RS resource according to the second configuration, or a precoding matrix that is based at least in part on the second CSI-RS port configuration.

Aspect 15: The method of Aspect 14, wherein the second CSI-RS port configuration indicates Q CSI-RS ports for CSI measurement, wherein the CQI is based at least in part on a vector y that comprises Q antenna port numbers corresponding to the Q CSI-RS ports of the second CSI-RS port configuration.

Aspect 16: The method of Aspect 15, wherein an order of the Q antenna port numbers, with respect to the Q CSI-RS ports for CSI measurement, follows an order of the Q CSI-RS ports indicated by the second CSI-RS port configuration.

Aspect 17: The method of Aspect 15, wherein the CQI is based at least in part on the precoding matrix, and the precoding matrix corresponds to a value of Q.

Aspect 18: The method of Aspect 15, wherein the Q antenna port numbers are consecutive.

Aspect 19: The method of Aspect 15, wherein Q and v are positive integers.

Aspect 20: The method of any of Aspects 14-19, wherein the first CSI-RS port configuration indicates P CSI-RS ports for CSI measurement, the second CSI-RS port configuration indicates Q CSI-RS ports for CSI measurement, and a physical downlink shared channel (PDSCH) antenna port configuration indicates v PDSCH antenna ports, wherein the precoding matrix comprises Q rows and v columns.

Aspect 21: The method of Aspect 20, wherein the Q rows are selected from another precoding matrix comprising P rows and v columns.

Aspect 22: The method of Aspect 21, wherein the CQI is based at least in part on a vector y that comprises Q antenna port numbers corresponding to the Q CSI-RS ports of the second CSI-RS port configuration, wherein an order of the Q antenna port numbers in the vector y, with respect to the Q active CSI-RS ports, follows an order of the Q active CSI-RS ports indicated by the second CSI-RS port configuration.

Aspect 23: The method of any of Aspects 14-22, wherein the first CSI-RS port configuration indicates P CSI-RS ports for CSI measurement, the second CSI-RS port configuration indicates Q CSI-RS ports for CSI measurement, and a physical downlink shared channel (PDSCH) antenna port configuration indicates v PDSCH antenna ports, wherein the precoding matrix comprises P rows and v columns.

Aspect 24: The method of Aspect 23, wherein Q rows of the precoding matrix are set to non-zero values, and wherein the Q rows correspond to the Q CSI-RS ports for CSI measurement.

Aspect 25: The method of Aspect 24, wherein (P minus Q) rows of the precoding matrix are set to zero values.

Aspect 26: The method of Aspect 23, wherein the CQI is based at least in part on a vector y that comprises P antenna port numbers corresponding to the P CSI-RS ports of the first CSI-RS port configuration.

Aspect 27: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-26.

Aspect 28: An apparatus for wireless communication at a device, the apparatus comprising one or more memories and one or more processors coupled to the one or more memories, the one or more processors configured to cause the device to perform the method of one or more of Aspects 1-26.

Aspect 29: An apparatus for wireless communication, the apparatus comprising at least one means for performing the method of one or more of Aspects 1-26.

Aspect 30: A non-transitory computer-readable medium storing code for wireless communication, the code comprising instructions executable by one or more processors to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

Aspect 32: A device for wireless communication, the device comprising a processing system that includes one or more processors and one or more memories coupled with the one or more processors, the processing system configured to cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:
one or more memories; and
one or more processors coupled to the one or more memories, the one or more processors individually or collectively configured to cause the UE to:
receive a first configuration of a first channel state information reference signal (CSI-RS) resource for channel measurement with a first CSI-RS port configuration;
receive a second configuration with a second CSI-RS port configuration that is a subset of the first CSI-RS port configuration; and transmit a channel quality indicator (CQI), wherein the CQI is based at least in part on
renumbered CSI-RS port numbers of a second CSI-RS resource from an original port numbering to a consecutive port numbering according to the second configuration, wherein the second CSI-RS resource is a subset of the first CSI-RS resource.

2. The UE of claim 1, wherein the second CSI-RS port configuration indicates Q CSI-RS ports for CSI measurement, and wherein the CQI is based at least in part on a vector y that comprises Q antenna port numbers corresponding to the Q CSI-RS ports of the second CSI-RS port configuration.

3. The UE of claim 2, wherein an order of the Q antenna port numbers, with respect to the Q CSI-RS ports for CSI measurement, follows an order of the Q CSI-RS ports indicated by the second CSI-RS port configuration.

4. The UE of claim 2, wherein the CQI is based at least in part on a precoding matrix that is based at least in part on the second CSI-RS port configuration, and the precoding matrix corresponds to a value of Q.

5. The UE of claim 2, wherein the Q antenna port numbers are consecutive.

6. The UE of claim 2, wherein Q and y are positive integers.

7. The UE of claim 1, wherein the first CSI-RS port configuration indicates P CSI-RS ports for CSI measurement, the second CSI-RS port configuration indicates Q CSI-RS ports for CSI measurement, and a physical downlink shared channel (PDSCH) antenna port configuration indicates v PDSCH antenna ports, wherein the CQI is based at least in part on a precoding matrix that is based at least in part on the second CSI-RS port configuration, and wherein the precoding matrix comprises Q rows and v columns.

8. The UE of claim 7, wherein the Q rows are selected from another precoding matrix comprising P rows and v columns.

9. The UE of claim 7, wherein the CQI is based at least in part on a vector y that comprises Q antenna port numbers corresponding to the Q CSI-RS ports of the second CSI-RS port configuration, wherein an order of the Q antenna port numbers in the vector y, with respect to the Q CSI-RS ports, follows an order of the Q CSI-RS ports indicated by the second CSI-RS port configuration.

10. The UE of claim 1, wherein the first CSI-RS port configuration indicates P CSI-RS ports for CSI measurement, the second CSI-RS port configuration indicates Q CSI-RS ports for CSI measurement, and a physical downlink shared channel (PDSCH) antenna port configuration indicates v PDSCH antenna ports, wherein the CQI is based at least in part on a precoding matrix that is based at least in part on the second CSI-RS port configuration, and wherein the precoding matrix comprises P rows and v columns.

11. The UE of claim 10, wherein Q rows of the precoding matrix are set to non-zero values, and wherein the Q rows correspond to the Q CSI-RS ports for CSI measurement.

12. The UE of claim 10, wherein (P minus Q) rows of the precoding matrix are set to zero values.

13. The UE of claim 10, wherein the CQI is based at least in part on a vector y that comprises P antenna port numbers corresponding to the P CSI-RS ports of the first CSI-RS port configuration.

14. The UE of claim 1, wherein the one or more processors are configured to cause the UE to measure the second CSI-RS resource associated with the second configuration and the first CSI-RS resource, wherein the CQI is based at least in part on measuring the second CSI-RS resource.

15. A network node for wireless communication, comprising:

one or more memories; and one or more processors coupled to the one or more memories, the one or more processors individually or collectively configured to cause the network node to:

transmit a first configuration of a first channel state information reference signal (CSI-RS) resource for channel measurement with a first CSI-RS port configuration;

transmit a second configuration with a second CSI-RS port configuration that is a subset of the first CSI-RS port configuration;

transmit a second CSI-RS resource associated with the second configuration and the first CSI-RS resource, wherein the second CSI-RS resource is a subset of the first CSI-RS resource; and receive a channel quality indicator (CQI) that is based on renumbered CSI-RS port numbers of the second CSI-RS resource from an original port numbering to a consecutive port numbering according to the second configuration.

16. The network node of claim 15, wherein the second CSI-RS port configuration indicates Q CSI-RS ports for CSI measurement, wherein the CQI is based at least in part on a vector y that comprises Q antenna port numbers corresponding to the Q CSI-RS ports of the second CSI-RS port configuration.

17. The network node of claim 16, wherein an order of the Q antenna port numbers, with respect to the Q CSI-RS ports for CSI measurement, follows an order of the Q CSI-RS ports indicated by the second CSI-RS port configuration.

18. The network node of claim 16, wherein the CQI is based at least in part on a precoding matrix that is based at least in part on the second CSI-RS port configuration, and the precoding matrix corresponds to a value of Q.

19. The network node of claim 16, wherein the Q antenna port numbers are consecutive.

20. The network node of claim 16, wherein Q and v are positive integers.

21. The network node of claim 15, wherein the first CSI-RS port configuration indicates P CSI-RS ports for CSI measurement, the second CSI-RS port configuration indicates Q CSI-RS ports for CSI measurement, and a physical downlink shared channel (PDSCH) antenna port configuration indicates v PDSCH antenna ports, wherein the CQI is based at least in part on a precoding matrix that is based at least in part on the second CSI-RS port configuration, and wherein the precoding matrix comprises Q rows and v columns.

22. The network node of claim 21, wherein the Q rows are selected from another precoding matrix comprising P rows and v columns.

23. The network node of claim 15, wherein the first CSI-RS port configuration indicates P CSI-RS ports for CSI measurement, the second CSI-RS port configuration indicates Q CSI-RS ports for CSI measurement, and a physical downlink shared channel (PDSCH) antenna port configuration indicates v PDSCH antenna ports, wherein the COI is based at least in part on a precoding matrix that is based at least in part on the second CSI-RS port configuration, and wherein the precoding matrix comprises P rows and v columns.

24. The network node of claim 23, wherein Q rows of the precoding matrix are set to non-zero values, and wherein the Q rows correspond to the Q CSI-RS ports for CSI measurement.

25. The network node of claim 24, wherein (P minus Q) rows of the precoding matrix are set to zero values.

26. The network node of claim 23, wherein the CQI is based at least in part on a vector y that comprises P antenna port numbers corresponding to the P CSI-RS ports of the first CSI-RS port configuration.

27. A method of wireless communication performed by a user equipment (UE), comprising:

receiving a first configuration of a first channel state information reference signal (CSI-RS) resource for channel measurement with a first CSI-RS port configuration;

receiving a second configuration with a second CSI-RS port configuration that is a subset of the first CSI-RS port configuration; and transmitting a channel quality indicator (CQI), wherein the CQI is based at least in part on renumbering CSI-RS port numbers of a second CSI-RS resource according to the second configuration by renumbering the CSI-RS port numbers from an original port numbering to a consecutive port numbering, wherein the second CSI-RS resource is a subset of the first CSI-RS resource.

28. The method of claim 27, wherein the second CSI-RS port configuration indicates Q CSI-RS ports for CSI measurement, and wherein computing the CQI is based at least in part on a vector y that comprises Q antenna port numbers corresponding to the Q CSI-RS ports of the second CSI-RS port configuration.

29. A method of wireless communication performed by a network node, comprising:

transmitting a first configuration of a first channel state information reference signal (CSI-RS) resource for channel measurement with a first CSI-RS port configuration;

transmitting a second configuration with a second CSI-RS port configuration that is a subset of the first CSI-RS port configuration;

transmitting a second CSI-RS resource associated with the second configuration and the first CSI-RS resource, wherein the second CSI-RS resource is a subset of the first CSI-RS resource; and receiving a channel quality indicator (CQI) that is based on renumbered CSI-RS port numbers of the second CSI-RS resource from an original port numbering to a consecutive port numbering according to the second configuration.

30. The method of claim 29, wherein the second CSI-RS port configuration indicates Q CSI-RS ports for CSI measurement, wherein the CQI is based at least in part on a vector y that comprises Q antenna port numbers corresponding to the Q CSI-RS ports of the second CSI-RS port configuration.

* * * * *